United States Patent
Seo et al.

(10) Patent No.: US 9,100,158 B2
(45) Date of Patent: Aug. 4, 2015

(54) METHOD AND APPARATUS FOR TRANSMITTING MULTIPLE RECEPTION CONFIRMATIONS IN TIME DIVISION DUPLEX SYSTEM

(75) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 13/876,642

(22) PCT Filed: Sep. 29, 2011

(86) PCT No.: PCT/KR2011/007178
§ 371 (c)(1),
(2), (4) Date: Mar. 28, 2013

(87) PCT Pub. No.: WO2012/044082
PCT Pub. Date: Apr. 5, 2012

(65) Prior Publication Data
US 2013/0343238 A1    Dec. 26, 2013

Related U.S. Application Data

(60) Provisional application No. 61/387,956, filed on Sep. 29, 2010, provisional application No. 61/407,893, filed on Oct. 28, 2010, provisional application No. 61/410,343, filed on Nov. 4, 2010, provisional
(Continued)

(51) Int. Cl.
*H04W 80/04* (2009.01)
*H04J 3/16* (2006.01)
(Continued)

(52) U.S. Cl.
CPC ............ *H04L 5/0055* (2013.01); *H04L 1/0026* (2013.01); *H04L 1/1671* (2013.01);
(Continued)

(58) Field of Classification Search
USPC .................................. 370/328, 331, 337, 465
See application file for complete search history.

(56) References Cited

U.S. PATENT DOCUMENTS

2010/0029279 A1* 2/2010 Lee et al. ........................ 455/436
2011/0218011 A1* 9/2011 Kim et al. ....................... 455/517
(Continued)

OTHER PUBLICATIONS

Panasonic, "Support of UL ACK/NACK channel selection for carrier aggregation", R1-101253, 3GPP TSG RAN WG1 Meeting #60, Feb. 2010, 6 pages.
(Continued)

*Primary Examiner* — Andrew Lee
(74) *Attorney, Agent, or Firm* — Lee, Hong, Degerman, Kang & Waimey

(57) ABSTRACT

A method and device for transmitting acknowledgement/non-acknowledgement (ACK/NACK) by User Equipment (UE) for which a plurality of serving cells has been configured in a wireless communication system operating in Time Division Duplex (TDD). The method includes: configuring a plurality of serving cells; receiving a codeword through at least one of the plurality of configured serving cells; and transmitting ACK/NACK information indicative of reception acknowledgement for the codeword. Here, if the UE receives the codeword through only a first serving cell of the plurality of configured serving cells, the UE transmits the ACK/NACK information according to a first transmission scheme, and the first transmission scheme is a scheme for sending ACK/NACK when the UE receives only one configured serving cell.

10 Claims, 18 Drawing Sheets

Related U.S. Application Data application No. 61/411,882, filed on Nov. 9, 2010, provisional application No. 61/481,712, filed on May 2, 2011, provisional application No. 61/481,250, filed on May 2, 2011, provisional application No. 61/482,207, filed on May 3, 2011, provisional application No. 61/483,068, filed on May 6, 2011, provisional application No. 61/487,257, filed on May 17, 2011.

(51) Int. Cl.
  *H04L 5/00* (2006.01)
  *H04L 1/16* (2006.01)
  *H04L 1/18* (2006.01)
  *H04L 1/00* (2006.01)

(52) U.S. Cl.
  CPC .............. *H04L1/1861* (2013.01); *H04L 5/001* (2013.01); *H04L 5/003* (2013.01); *H04L 5/0053* (2013.01); *H04L 2001/0093* (2013.01)

(56) References Cited

U.S. PATENT DOCUMENTS

| | | | |
|---|---|---|---|
| 2012/0094711 A1* | 4/2012 | Lee et al. | 455/525 |
| 2013/0064180 A1* | 3/2013 | Bergman et al. | 370/328 |
| 2013/0178219 A1* | 7/2013 | Lee et al. | 455/450 |
| 2013/0208633 A1* | 8/2013 | Gao et al. | 370/280 |
| 2014/0050180 A1* | 2/2014 | Kimura | 370/329 |

OTHER PUBLICATIONS

Nokia Siemens Networks, et al., "On the PUCCH Resource Allocation and A/N Codebook Size for Carrier Aggregation", R1-103783, 3GPP TSG RAN WG1 Meeting #61bis, Jun. 2010, 3 pages.

Texas Instruments, "Resource Allocation for A/N Transmission on PUCCH", R1-104466, 3 GPP TSG RAN WG1 #62, Aug. 2010, 4 pages.

Pantech, "UL PUCCH A/N resource allocation for CA", R1-104632, 3GPP TSG RAN1 #62, Aug. 2010, 4 pages.

Panasonic, "Support of UL ACK/NACK channel selection for carrier aggregation," 3GPP TSG RAN WG1 Meeting #60, R1-101253, Feb. 2010, 6 pages.

Texas Instruments, "Resource Allocation for A/N Transmission on PUCCH," 3GPP TSG RAN WG1 #62, R1-104466, Aug. 2010, 4 pages.

Korean Intellectual Property Office Application Serial No. 10-2013-7007727, Office Action dated Aug. 18, 2014, 4 pages.

* cited by examiner

METHOD AND APPARATUS FOR TRANSMITTING MULTIPLE RECEPTION CONFIRMATIONS IN TIME DIVISION DUPLEX SYSTEM

CROSS-REFERENCE TO RELATED APPLICATIONS

This application is the National Stage filing under 35 U.S.C. 371 of International Application No. PCT/KR2011/007178, filed on Sep. 29, 2011, which claims the benefit of U.S. Provisional Application Ser. No. 61/387,956, filed on Sep. 29, 2010, U.S. Provisional Application Ser. No. 61/407,893, filed on Oct. 28, 2010, U.S. Provisional Application Ser. No. 61/410,343 filed Nov. 4, 2010, U.S. Provisional Application Ser. No. 61/411,882, filed on Nov. 9, 2010, U.S. Provisional Application Ser. No. 61/481,250, filed on May 2, 2011, U.S. Provisional Application Ser. No. 61/481,712, filed on May 2, 2011, U.S. Provisional Application Ser. No. 61/482,207, filed on May 3, 2011, U.S. Provisional Application Ser. No. 61/483,068, filed on May 6, 2011, U.S. Provisional Application Ser. No. 61/487,257, filed on May 17, 2011, the contents of which are all hereby incorporated by reference herein in their entirety.

TECHNICAL FIELD

The present invention relates to wireless communication and, more particularly, to a method and apparatus in which user equipment sends a plurality of pieces of reception acknowledgement information in a wireless communication system operating in Time Division Duplex (TDD).

BACKGROUND ART

In wireless communication systems, effective transmission/reception schemes and utilization schemes have been proposed in order to maximize the efficiency of limited radio resources. One of systems that are being taken into consideration in the next-generation wireless communication systems is a multi-carrier system. A multi-carrier system means a system for configuring a wide band by aggregating one or more carriers, each having a smaller bandwidth than a target wide band, when a wireless communication system tries to support a wide band.

A conventional wireless communication system, such as $3^{rd}$ Generation Partnership Project (3GPP) Long Term Evolution (LTE), uses carriers having various bandwidths, but the system was a single carrier system. In contrast, the next-generation wireless communication system, such as LTE-Advanced (LTE-A), can be a multi-carrier system using an aggregation of a plurality of carriers.

In a multi-carrier system, user equipment can receive a plurality of data units through a plurality of downlink carriers and feed a plurality of pieces of reception acknowledgement information, that is, acknowledgement/non-acknowledgement (ACK/NACK), for the plurality of data units back to a base station.

A multi-carrier system can operate either 1) in Frequency Division Duplex (FDD) in which uplink transmission and downlink transmission can be performed in different frequency bands at the same time or 2) in Time Division Duplex (TDD) in which uplink transmission and downlink transmission can be performed on different times, that is, in different subframes, in the same frequency band. If a multi-carrier system operates in TDD, the multi-carrier system may have to send ACK/NACKs for data units received through a plurality of downlink subframes for each of a plurality of downlink component carriers (DL CC) in one uplink subframe of an uplink component carrier (UL CC). In this case, the amount of ACK/NACK information fed back by user equipment is more increased than that of a conventional single carrier system.

Accordingly, there is a need for a method and apparatus for transmitting ACK/NACK different from an existing method of transmitting ACK/NACK that is used when a single carrier system operates in TDD.

DISCLOSURE

Technical Problem

An object of the present invention is to provide a method and apparatus for transmitting a plurality of ACK/NACKs in a multi-carrier system operating in TDD.

Technical Solution

In accordance with an aspect of the present invention, there is provided a method of transmitting acknowledgement/non-acknowledgement (ACK/NACK) by User Equipment (UE) for which a plurality of serving cells has been configured in a wireless communication system operating in Time Division Duplex (TDD). The method includes the steps of receiving the plurality of configured serving cells; receiving a codeword through at least one of the plurality of configured serving cells; and sending ACK/NACK information indicative of reception acknowledgement for the codeword, wherein if the UE receives the codeword through only a first serving cell of the plurality of configured serving cells, the UE sends the ACK/NACK information according to a first transmission scheme, and the first transmission scheme is a scheme for sending ACK/NACK when the UE receives only one configured serving cell.

In accordance with an aspect of the present invention, a method of transmitting acknowledgement/non-acknowledgement (ACK/NACK) by User Equipment (UE) for which a plurality of serving cells has been configured in a wireless communication system operating in Time Division Duplex (TDD) includes receiving the plurality of configured serving cells; receiving a codeword through at least one of the plurality of configured serving cells; and sending ACK/NACK information indicative of reception acknowledgement for the codeword, wherein if the UE receives the codeword through only a first serving cell of the plurality of configured serving cells, the UE sends the ACK/NACK according to a first transmission scheme, and if the UE receives the codeword through the first serving cell and a second serving cell, the UE sends the ACK/NACK according to a second transmission scheme.

Advantageous Effects

In accordance with the present invention, user equipment can send ACK/NACK without an error even if a configured serving cell is changed.

MODE FOR INVENTION

Technologies hereinafter can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as Institute of Electrical and Electronics Engineers (IEEE) 802.11 (Wi-Fi), IEEE 802.16 (WiMAX), IEEE 802.20, or Evolved UTRA (E-UTRA). IEEE 802.16m is the evolution of IEEE 802.16e, and it provides backward compatibility with systems based on IEEE 802.16e. UTRA is part of a Universal Mobile Telecommunications System (UMTS). $3^{rd}$ Generation Partnership Project (3GPP) Long Term Evolution (LTE) is part of an Evolved UMTS (E-UMTS) using Evolved-UMTS Terrestrial Radio Access (E-UTRA), and 3GPP LTE adopts OFDMA in downlink and adopts SC-FDMA in uplink. LTE-Advanced (LTE-A) is the evolution of 3GPP LTE. In order to clarify a description, LTE and LTE-A are chiefly described, but the technical spirit of the present invention is not limited thereto.

Figure 1:
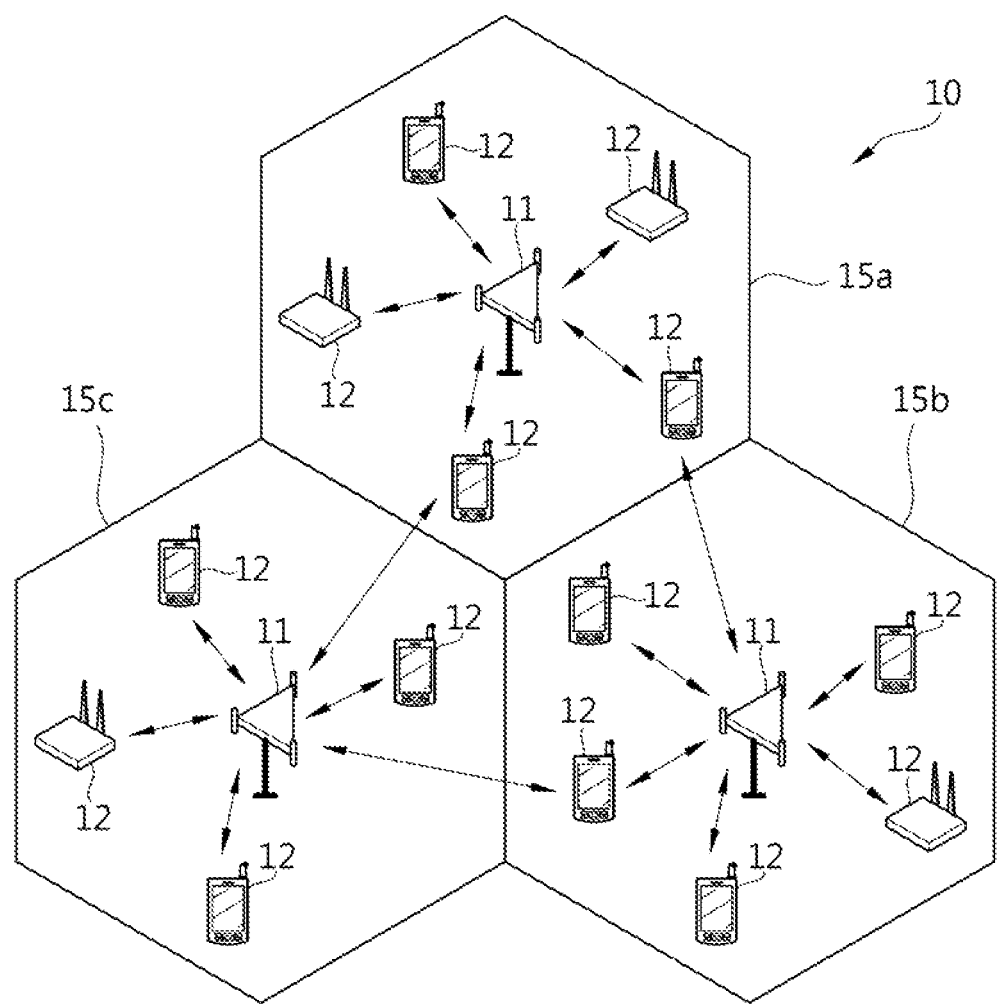
FIG. 1 shows a wireless communication system.

FIG. 1 shows a wireless communication system.

The wireless communication system 10 includes one or more Base Stations (BSs) 11. The BSs 11 provide communication services to respective geographical areas 15a, 15b, and 15c. User Equipment (UE) 12 can be fixed or mobile and also be called another terminology, such as a Mobile Station (MS), a Mobile Terminal (MT), a User Terminal (UT), a Subscriber Station (SS), a wireless device, a Personal Digital Assistant (PDA), a wireless modem, or a handheld device.

The BS 11 commonly refers to a fixed station communicating with the UEs 12, and the BS 11 can also be called another terminology, such as an evolved-NodeB (eNB), a Base Transceiver System (BTS), or an access point.

Hereinafter, downlink refers to communication from the BS 11 to the UE 12, and uplink refers to communication from the UE 12 to the BS 11. The wireless communication system can be chiefly divided into a Frequency Division Duplex (FDD) method and a Time Division Duplex (TDD) method. In accordance with the FDD method, uplink transmission and downlink transmission can be performed at the same time while occupying different frequency bands. In accordance with the TDD method, uplink transmission and downlink transmission are performed on different times while occupying the same frequency band.

Figure 2:
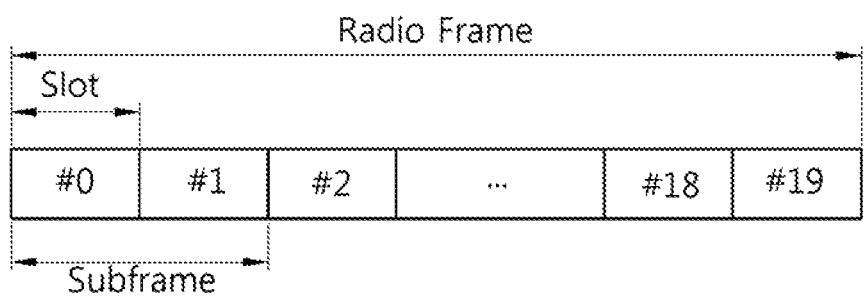
FIG. 2 shows the structure of a radio frame in 3GPP LTE.

FIG. 2 shows the structure of a radio frame in 3GPP LTE.

Referring to FIG. 2, the radio frame includes 10 subframes, and one subframe includes two slots. The slots within the radio frame are assigned slot numbers from #0 to #19. The time taken for one subframe to be transmitted is called a Transmission Time Interval (TTI). The TTI can be called a scheduling unit for data transmission. For example, the length of one radio frame can be 10 ms, the length of one subframe can be 1 ms, and the length of one slot can be 0.5 ms.

One slot includes a plurality of Orthogonal Frequency Division Multiplexing (OFDM) symbols in the time domain. The OFDM symbol is for representing one symbol period because 3GPP LTE uses OFDMA in downlink and can be called another terminology. For example, if SC-FDMA is used as a multi-access scheme, the OFDM symbol can be called an SC-FDMA symbol. In 3GPP LTE, one slot is defined to include 7 OFDM symbols in a normal Cyclic Prefix (CP), and one slot is defined to include 6 OFDM symbols in an extended CP.

Figure 3:
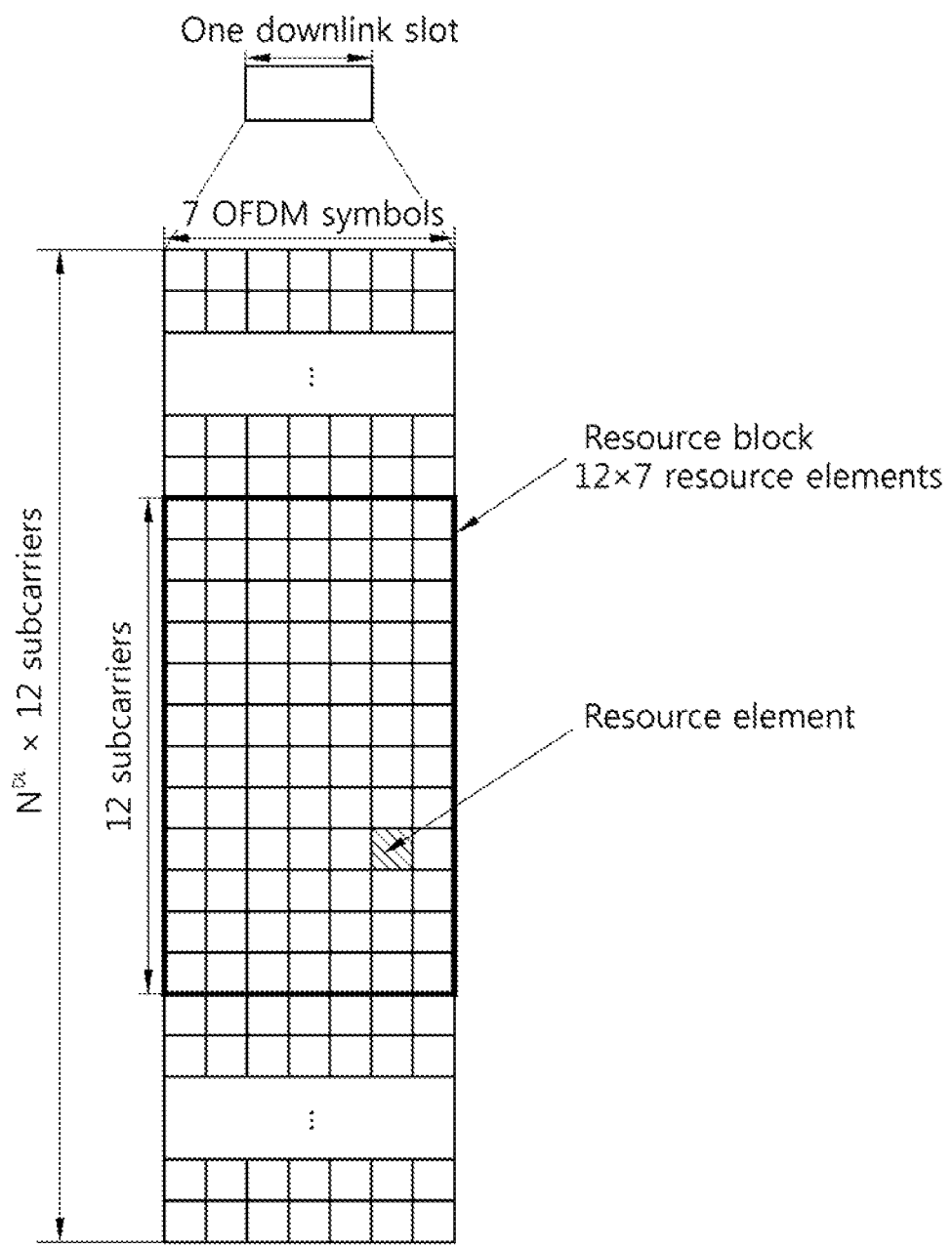
FIG. 3 shows an example of a resource grid for one downlink slot.

FIG. 3 shows an example of a resource grid for one downlink slot.

A downlink slot includes a plurality of OFDM symbols in the time domain and includes an $N_{RB}$ number of Resource Blocks (RBs) in the frequency domain. The resource block includes a plurality of contiguous subcarriers in one slot. FIG. 3 illustrates an example in which one resource block includes 7 OFDM symbols in the time domain and includes 12 subcarriers in the frequency domain, but the present invention is not limited thereto. The number of OFDM symbols and the number of subcarriers within the resource block can be changed in various ways depending on the length of a CP, frequency spacing, etc. For example, in the case of a normal CP, the number of OFDM symbols is 7, and in the case of an extended CP, the number of OFDM symbols is 6. In one OFDM symbol, one of 128, 256, 512, 1024, 1536, and 2048 can be selected and used as the number of subcarriers. The number of resource blocks NRB included in a downlink slot depends on a downlink transmission bandwidth that is configured in a cell. For example, in an LTE system, the $N_{RB}$ may be any one of 6 to 110.

Each of the elements on the resource grid is called a Resource Element (RE). The RE can be identified by an index pair (k,l) within a slot. Here, k(k=0, . . . , $N_{RB}$×12-1) is a subcarrier index, and l(l=0, . . . ,6) is an OFDM symbol index.

The structure of an uplink slot can be the same as that of the downlink slot.

Figure 4:
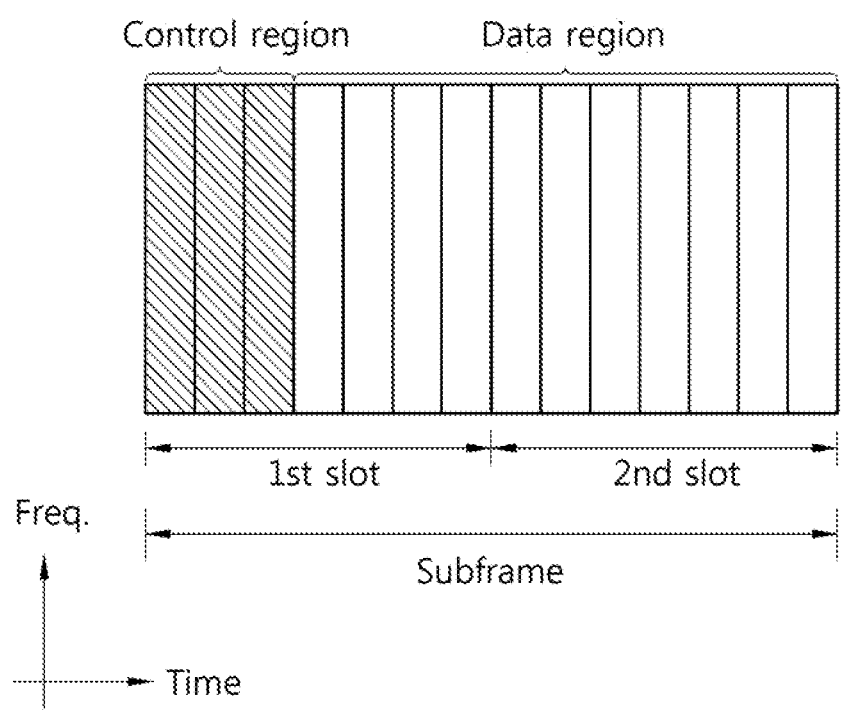
FIG. 4 shows the structure of a downlink subframe.

FIG. 4 shows the structure of a downlink subframe.

A downlink subframe includes 2 slots in the time domain, and each slot includes 7 OFDM symbols in the normal CP. A maximum of former 3 OFDM symbols (a maximum of 4 OFDM symbols in relation to a 1.4 MHz bandwidth) in the first slot within the downlink subframe become a control region to which control channels are allocated, and the remaining OFDM symbols become a data region to which physical downlink shared channels (PDSCHs) are allocated.

A PDCCH can carry the resource allocation and transport format of a downlink-shared channel (DL-SCH), information about the resource allocation for an uplink shared channel (UL-SCH), paging information on a paging channel (PCH), system information on a DL-SCH, and the resource allocation of a higher layer control message, such as a random access response transmitted on a PDSCH, a set of transmission power control commands for each UE within a specific UE group, and the activation of a Voice over Internet Protocol (VoIP). The above-described control information transmitted through a PDCCH is called Downlink Control Information (DCI).

A plurality of PDCCHs can be transmitted within the control region, and UE can monitor a plurality of PDCCHs. The PDCCH is transmitted on one Control Channel Element (CCE) or an aggregation of some contiguous CCEs. The CCE is a logical allocation unit used to provide a PDCCH with a coding rate according to the state of a radio channel. The CCE corresponds to a plurality of Resource Element Groups (REGs). One REG includes 4 REs, and one CCE includes 9 REGs. In order to configure one PDCCH, {1, 2, 4, 8} CCEs can be used. The number of CCEs configuring the PDCCH, that is, each of {1, 2, 4, 8}, is called a CCE aggregation level. The format of the PDCCH and the number of bits of the PDCCH that can be transmitted are determined by the number of CCEs and a relation between coding rates provided by the CCEs.

A BS determines a PDCCH format based on DCI that will be transmitted to UE and attaches a Cyclic Redundancy Check (CRC) to control information. A unique identifier (i.e., a Radio Network Temporary Identifier (RNTI)) is masked to the CRC depending on the owner or use of the PDCCH. If the PDCCH is for specific UE, an identifier unique to the UE, for example, a Cell-RNTI (C-RNTI) can be masked to the CRC. Or, if the PDCCH is for a paging message, a paging indication identifier, that is, a Paging-RNTI (P-RNTI), can be masked to the CRC. If the PDCCH is for a System Information Block (SIB), a system information identifier, that is, a System Information-RNTI (SI-RNTI), can be masked to the CRC. A Random Access-RNTI (RA-RNTI) can be masked to the CRC in order to indicate a random access response, that is, a response to the transmission of the random access response of the UE.

Figure 5:
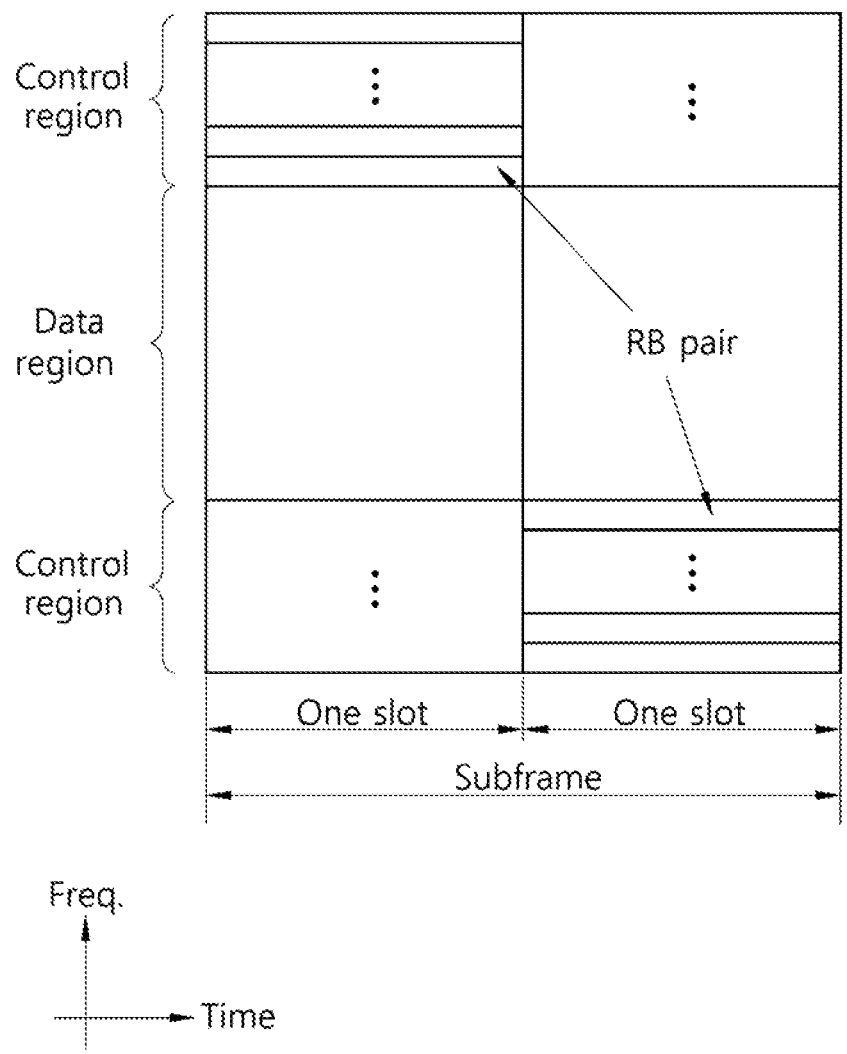
FIG. 5 shows the structure of an uplink subframe.

FIG. 5 shows the structure of an uplink subframe.

An uplink subframe can be divided into a control region and a data region in the frequency domain. A physical uplink control channel (PUCCH) on which Uplink Control Information (UCI) is transmitted is allocated to the control region. A physical uplink shared channel (PUSCH) on which uplink data and/or UCI is transmitted is allocated to the data region. In this sense, the control region can be called a PUCCH region, and the data region can be called a PUSCH region. UE may support the simultaneous transmission of a PUSCH and a PUCCH or may not support the simultaneous transmission of a PUSCH and a PUCCH depending on configuration information indicated by a higher layer.

A PUSCH is mapped to an uplink shared channel (UL-SCH), that is, a transport channel. Uplink data transmitted on the PUSCH can be a transport block (i.e., a data block for an UL-SCH transmitted during a TTI). Or, the uplink data can be multiplexed data. The multiplexed data can be obtained by multiplexing a transport block for an UL-SCH and UCI. For example, the multiplexed UCI can include a Channel Quality Indicator (CQI), a Precoding Matrix Indicator (PMI), Hybrid Automatic Repeat Request (HARQ) acknowledgement/non-acknowledgement (ACK/NACK), a Rank Indicator (RI), and a Precoding Type Indication (PTI). Only UCI can be transmitted on the PUSCH.

A PUCCH for one MS is allocated in the form of a Resource Block pair (RB pair) in a subframe. Resource blocks belonging to an RB pair occupy different subcarriers in a first slot and a second slot. That is, a frequency occupied by the resource blocks belonging to the RB pair is changed on the basis of a slot boundary. This is said that the RB pair allocated to the PUCCH has been frequency-hopped at the slot boundary. A frequency diversity gain can be obtained if UE sends UCI through different subcarriers over time.

A PUCCH carries various types of pieces of control information depending on the format. A PUCCH format 1 carries a Scheduling Request (SR). Here, an On-Off Keying (OOK) scheme can be used. A PUCCH format 1a carries acknowledgement/non-acknowledgement (ACK/NACK) modulated according to a Binary Phase Shift Keying (BPSK) scheme in relation to one codeword. A PUCCH format 1b carries ACK/NACK modulated according to a Quadrature Phase Shift Keying (QPSK) scheme in relation to two codewords. A PUCCH format 2 carries a Channel Quality Indicator (CQI) modulated according to a QPSK scheme. PUCCH formats 2a and 2b carry a CQI and ACK/NACK. A PUCCH format 3 is modulated according to a QPSK scheme, and the PUCCH format 3 can carry a plurality of ACK/NACKs and an SR.

Table 1 shows modulation schemes according to the PUCCH formats and the number of bits within a subframe.

TABLE 1

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

Figure 6:
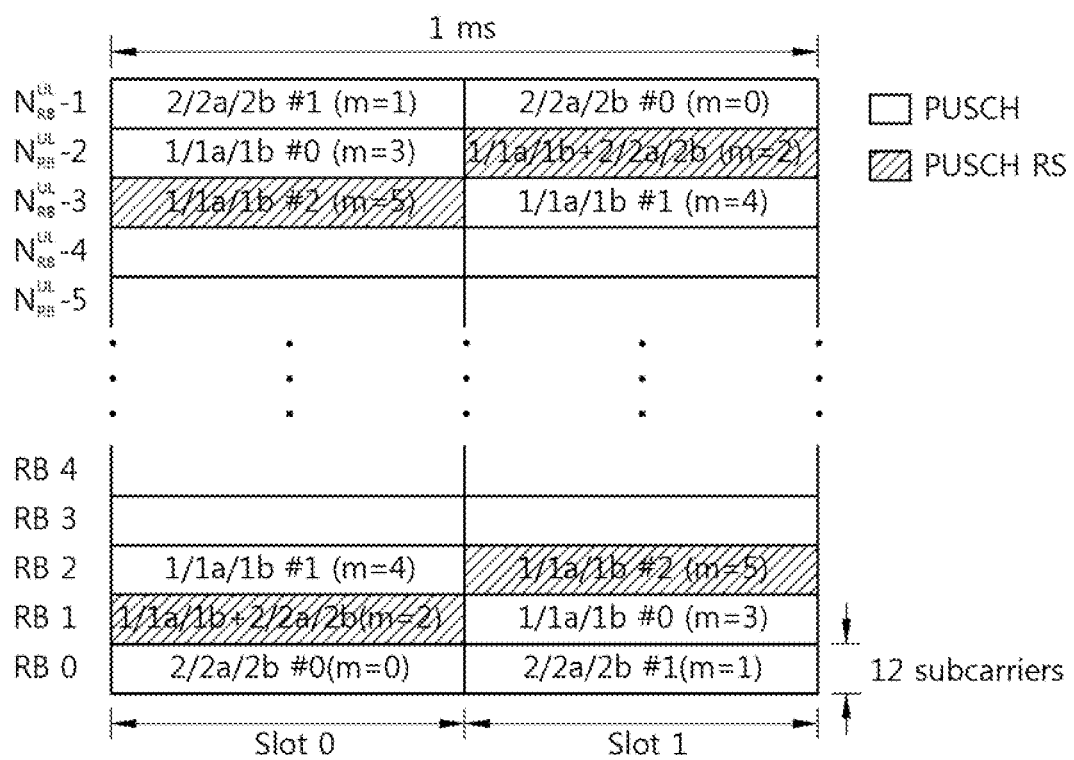
FIG. 6 shows a physical mapping relation between PUCCH formats and a control region.

FIG. 6 shows a physical mapping relation between the PUCCH formats and the control region.

Referring to FIG. 6, the PUCCH formats 2/2a/2b are mapped to RBs (e.g., m=0, 1 in a PUCCH region) at the edge of an allocated band and then transmitted. A mixed PUCCH RB can be mapped to an RB (e.g., m=2) adjacent in the direction of the center of the band, from among the RBs to which the PUCCH formats 2/2a/2b are allocated, and then transmitted. The PUCCH formats 1/1a/1b in which an SR and ACK/NACK are transmitted can be disposed in an RB, that is, m=4 or m=5.

All the PUCCH formats use the Cyclic Shift (CS) of a sequence in each OFDM symbol. The cyclic shifted-sequence is generated by cyclically shifting a base sequence by a specific CS amount. The specific CS amount is indicated by a CS index.

An example of the definition of the base sequence $r_u(n)$ is as follows.

$$r_u(n) = e^{jb(n)\pi/4} \qquad \text{[Equation 1]}$$

Here, u is a root index, n is an element index wherein $0 \leq n \leq N-1$, and N is the length of the base sequence. b(n) is defined in section 5.5 of 3GPP TS 36.211 V8.7.0.

The length of the sequence is equal to the number of elements included in the sequence. u can be determined by a cell identifier (ID) and a slot number within a radio frame. Assuming that the base sequence is mapped to one resource block in the frequency domain, the length N of the base sequence becomes 12 because one resource block includes 12 subcarriers. A different base sequence is defined depending on a different root index.

A cyclic shifted-sequence $r(n, I_{cs})$ can be generated by cyclically shifting the base sequence $r(n)$ as in Equation 2 below.

$$r(n, I_{cs}) = r(n) \cdot \exp\left(\frac{j2\pi I_{cs} n}{N}\right), \qquad \text{[Equation 2]}$$

$$0 \le I_{cs} \le N-1$$

Here, $I_{cs}$ is a cyclic shift index indicating a CS amount ($0 \le I_{cs} \le N-1$).

Available cyclic shift indices of the base sequence refer to cyclic shift indices that can be derived from the base sequence depending on a CS interval. For example, if the length of the base sequence is 12 and a CS interval is 1, a total number of available cyclic shift indices of the base sequence is 12. Or, if the length of the base sequence is 12 and a CS interval is 2, a total number of available cyclic shift indices of the base sequence is 6.

The transmission of an HARQ ACK/NACK signal in the PUCCH formats 1a/1b is described below.

Figure 7:
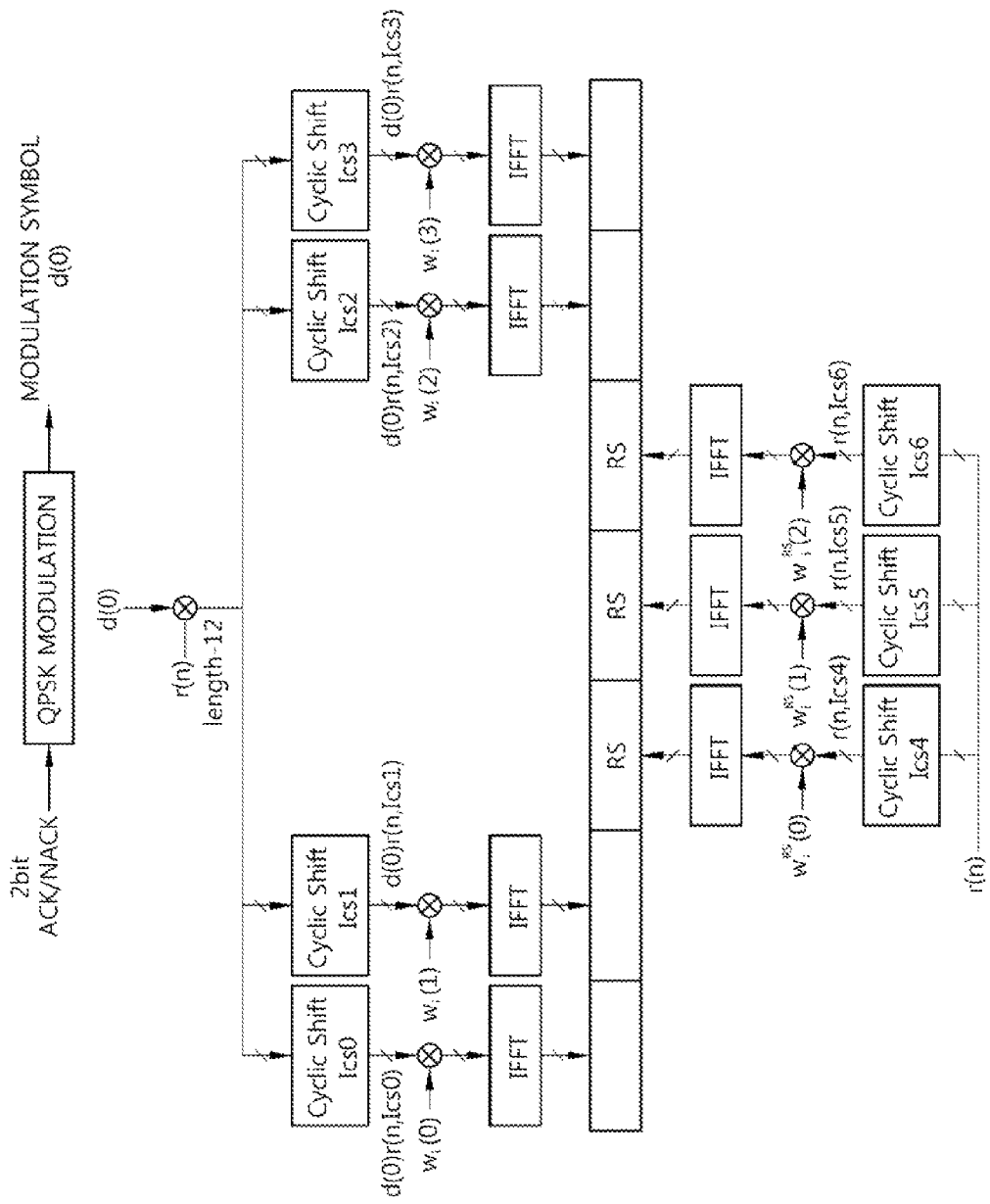
FIG. 7 shows a PUCCH format 1b in a normal CP in 3GPP LTE.

FIG. 7 shows the PUCCH format 1b in a normal CP in 3GPP LTE.

One slot includes 7 OFDM symbols, 3 OFDM symbols of the 7 OFDM symbols become Reference Signal (RS) symbols for a reference signal, and 4 OFDM symbols of the 7 OFDM symbols become data symbols for an ACK/NACK signal.

In the PUCCH format 1b, an encoded 2-bit ACK/NACK signal is subject to Quadrature Phase Shift Keying (QPSK) modulation, thereby generating a modulation symbol d(0).

A cyclic shift index $I_{cs}$ may vary depending on a slot number $n_s$ within a radio frame and/or a symbol index I within a slot.

Since 4 data symbols are present in one slot for the transmission of an ACK/NACK signal in a normal CP, cyclic shift indices corresponding to the respective four data symbols are assumed to be respective $I_{cs0}$, $I_{cs1}$, $I_{cs2}$, and $I_{cs3}$.

The modulation symbol d(0) is spread into a cyclic-shifted sequence $r(n,I_{cs})$. Assuming that a 1-dimensional spreading sequence corresponding to an $(i+1)^{th}$ OFDM symbol in the slot is m(i), $\{m(0), m(1), m(2), m(3)\} = \{d(0)r(n,I_{cs0}), d(0)r(n,I_{cs1}), d(0)r(n,I_{cs2}), d(0)r(n,I_{cs3})\}$.

In order to increase a UE capacity, a 1-dimensional spreading sequence can be spread using an orthogonal sequence. The following sequence is used as an orthogonal sequence $w_i(k)$ (i is a sequence index, $0 \le k \le K-1$), that is, a spreading factor K=4.

TABLE 2

| Index (i) | $[w_i(0), w_i(1), w_i(2), w_i(3)]$ |
|---|---|
| 0 | [+1, +1, +1, +1] |
| 1 | [+1, −1, +1, −1] |
| 2 | [+1, −1, −1, +1] |

The following sequence is used as an orthogonal sequence $w_i(k)$ (i is a sequence index, $0 \le k \le K-1$), that is, a spreading factor K=3.

TABLE 3

| Index (i) | $[w_i(0), w_i(1), w_i(2)]$ |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spreading factor can be used for each slot.

Accordingly, if a specific orthogonal sequence index i is given, 2-dimensional spreading sequences $\{s(0), s(1), s(2), s(3)\}$ can be represented as follows.

$\{s(0), s(1), s(2), s(3)\} = \{w_i(0)m(0), w_i(1)m(1), w_i(2)m(2), w_i(3)m(3)\}$

After IFFT is performed on the 2-dimensional spreading sequences $\{s(0), s(1), s(2), s(3)\}$, the 2-dimensional spreading sequences $\{s(0), s(1), s(2), s(3)\}$ are transmitted in corresponding OFDM symbols. Accordingly, an ACK/NACK signal is transmitted on a PUCCH.

The reference signal of the PUCCH format 1b is spread into an orthogonal sequence and then transmitted after cyclically shifting the base sequence r(n). Assuming that cyclic shift indices corresponding to 3 RS symbols are $I_{cs4}$, $I_{cs5}$, and $I_{cs6}$, 3 cyclic-shifted sequences $r(n,I_{cs4})$, $r(n,I_{cs5})$, and $r(n,I_{cs6})$ can be obtained. The 3 cyclic-shifted sequences are spread into an orthogonal sequence $w_{RS,i}(k)$, that is, K=3.

The orthogonal sequence index i, the cyclic shift index $I_{cs}$, and the resource block index m are parameters necessary to configure a PUCCH and are resources used to distinguish PUCCHs (or UEs) from each other. If the number of available cyclic shifts is 12 and the number of available orthogonal sequence indices is 3, a PUCCH for a total of UEs can be multiplexed into one resource block.

In 3GPP LTE, in order for UE to obtain the 3 parameters for configuring the PUCCH, a resource index $n^{(1)}_{PUCCH}$ is defined. $n^{(1)}_{PUCCH}$ is also called a PUCCH index. The resource index $n^{(1)}_{PUCCH}$ may be given as $n_{CCE} + N^{(1)}_{PUCCH}$. $n_{CCE}$ is the number of a first CCE used to send a corresponding PDCCH (i.e., a PDCCH including downlink resource allocation used to receive downlink data corresponding to an ACK/NACK signal), and $N^{(1)}_{PUCCH}$ is a parameter that UE is informed by a BS through a higher layer message.

Time, frequency, and code resources used to send the ACK/NACK signal are called ACK/NACK resources or PUCCH resources. As described above, ACK/NACK resources or PUCCH resources necessary to send an ACK/NACK signal on a PUCCH may be represented by an orthogonal sequence index i, a cyclic shift index $I_{cs}$, and a resource block index m or may be represented by a PUCCH index $n^{(1)}_{PUCCH}$ for calculating the 3 indices.

Figure 8:
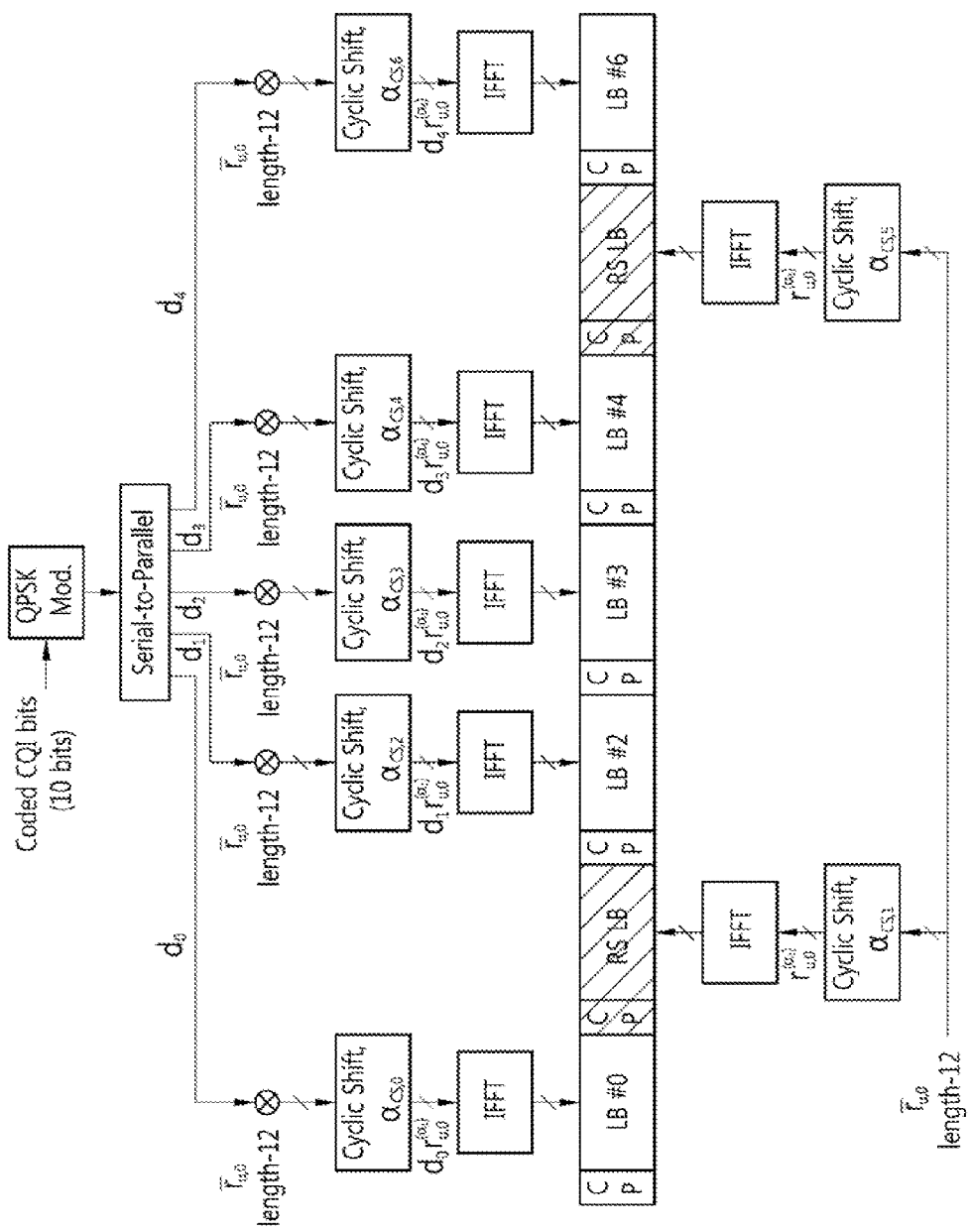
FIG. 8 shows the channel structure of PUCCH formats 2/2a/2b for one slot in a normal CP.

FIG. 8 shows the channel structure of the PUCCH formats 2/2a/2b for one slot in the normal CP. The PUCCH formats 2/2a/2b are used to send a CQI.

Referring to FIG. 8, in a normal CP, an SC-FDMA symbol 1, 5 is used for a demodulation Reference Symbol (DM RS), that is, an uplink reference signal. In the case of an extended CP, an SC-FDMA symbol 3 is used for a DM RS.

10 CQI information bits can be subject to channel coding, for example, at a 1/2 ratio, thus becoming 20 coded bits. A Reed-Muller code can be used in the channel coding. After the 20 coded bits are scrambled (in the same manner that PUSCH data is scrambled into a Gold sequence having a length 31), the scrambled bits are subject to QPSK constellation mapping, thus generating QPSK modulation symbols ($d_0$ to $d_4$ in a slot 0). The QPSK modulation symbols are modulated into the cyclic shifts of a base RS sequence having a length 12, subject to OFDM modulation, and then transmitted in respective 10 SC-FDMA symbols within a subframe. The 12 cyclic shifts are uniformly spaced apart from one another so that 12 different UEs can be orthogonally multiplexed in the same PUCCH resource block. A base RS sequence having a length 12 can be used as the DM RS sequence applied to the SC-FDMA symbols 1 and 5.

Figure 9:
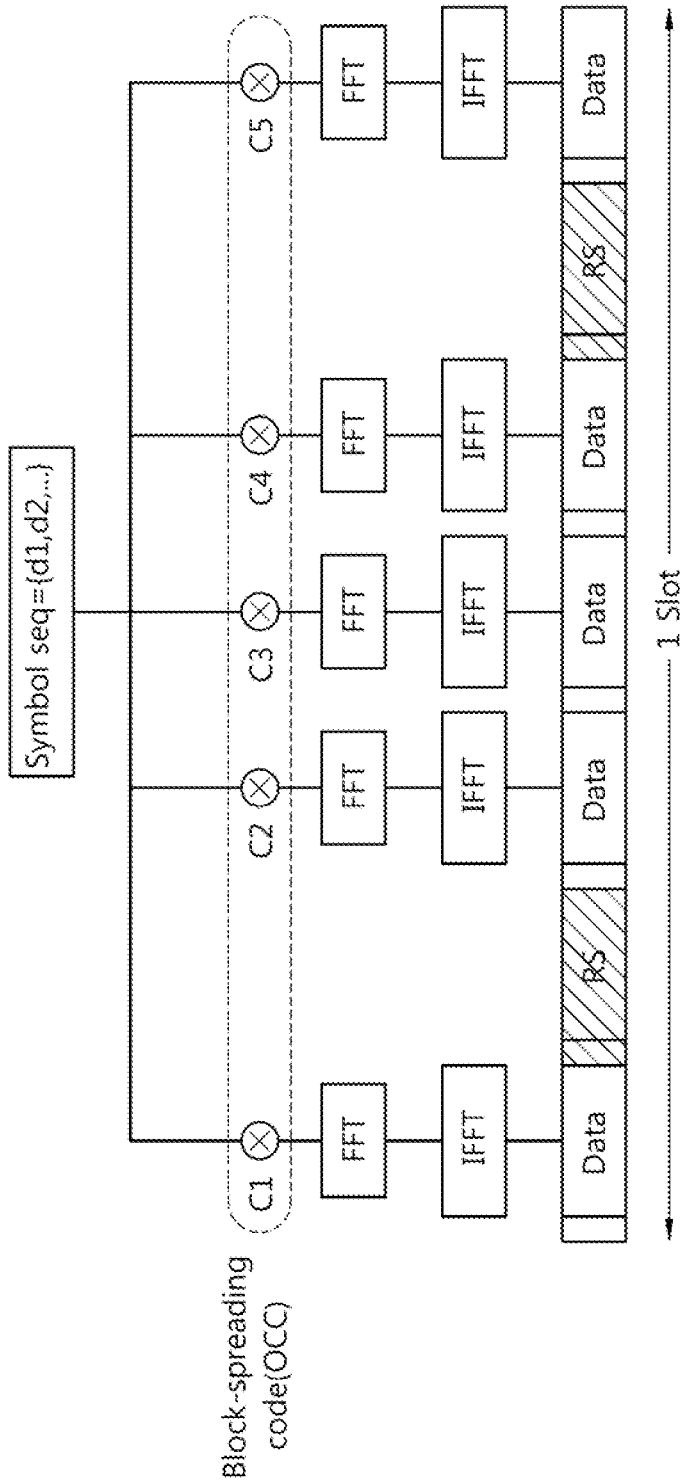
FIG. 9 shows a PUCCH format 3 in a normal CP.

FIG. 9 shows the PUCCH format 3 in the normal CP.

The PUCCH format 3 is a PUCCH format that uses a block spreading scheme. The block spreading scheme means a method of multiplexing modulation symbol sequences obtained by modulating multi-bit ACK/NACK using a block spreading code. An SC-FDMA scheme can be used as the block spreading scheme. Here, the SC-FDMA scheme means a transmission method of performing IFFT after DFT spreading.

In the PUCCH format 3, a symbol sequence is spread and transmitted in the time domain by means of a block spreading code. That is, in the PUCCH format 3, a symbol sequence consisting of one or more symbols is transmitted over the frequency domain of each data symbol and is spread and transmitted in the time domain by way of a block spreading code. An orthogonal cover code can be used as the block spreading code.

FIG. 9 illustrates an example in which 2 RS symbols are included in one slot, but the present invention is not limited thereto. 3 RS symbols may be included in one slot.

Figure 10:
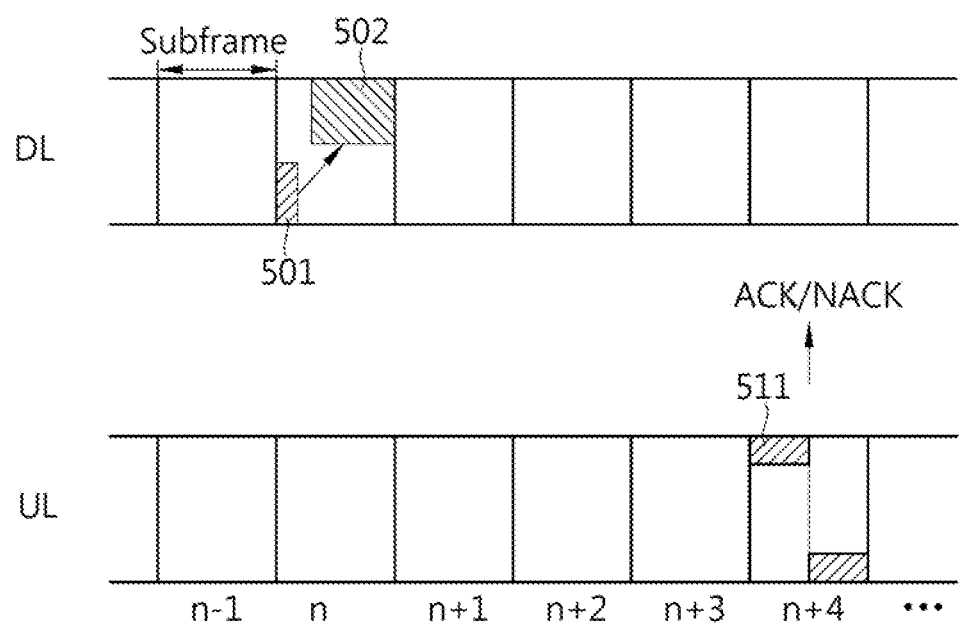
FIG. 10 shows an example of the execution of a Hybrid Automatic Repeat Request (HARQ) in FDD.

FIG. 10 shows an example of the execution of a Hybrid Automatic Repeat Request (HARQ) in FDD.

UE monitors a PDCCH and receives DL resource allocation (or called a DL grant) on a PDCCH 501 in an $n^{th}$ DL subframe. The UE receives a DL transport block through a PDSCH 502 indicated by the DL resource allocation.

The UE sends an ACK/NACK signal for the DL transport block on a PUCCH 511 in an $(n+4)^{th}$ UL subframe. The ACK/NACK signal can be said to be reception acknowledgement information for the DL transport block.

The ACK/NACK signal becomes an ACK signal when the DL transport block is successfully decoded and becomes a NACK signal when the decoding of the DL transport block fails. When the NACK signal is received, a BS can perform the retransmission of the DL transport block until the ACK signal is received or up to a maximum retransmission number.

In 3GPP LTE, in order to configure a resource index for the PUCCH 511, the resource allocation of the PDCCH 501 is used. That is, the lowest CCE index (or the index of a first CCE) used to send the PDCCH 501 becomes $n_{CCE}$, and a resource index is determined like $n^{(1)}_{PUCCH}=n_{CCE}+N^{(1)}_{PUCCH}$. PUCCH resources can be implicitly determined as described above.

A method of performing an HARQ in TDD is described below. In TDD, unlike in FDD, a DL subframe and a UL subframe temporally divided from each other are used in the same frequency band. The following table indicates an example of the structure of a configurable radio frame according to the arrangement of UL subframes and DL subframes. In the following table, 'D' indicates a DL subframe, 'U' indicates a UL subframe, and 'S' indicates a special subframe.

TABLE 4

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

As shown in Table 4, there is a case where a ratio of DL subframes and UL subframes within one radio frame does not correspond to 1:1. In particular, if the number of DL subframes is greater than the number of UL subframes, ACK/NACK for a data unit received in a plurality of DL subframes may have to be transmitted in one UL subframe.

In this case, UE can send one ACK/NACK for a plurality of PDSDHs. Two conventional methods can be used.

1. ACK/NACK Bundling

In the ACK/NACK bundling, one ACK is transmitted through one PUCCH if UE has successfully received all PDSCHs and sends NACK in all the remaining cases.

2. Channel Selection Using the PUCCH Format 1b Based on the Selection of PUCCH Resources (Hereinafter Abbreviated as Channel Selection).

This method is a scheme for allocating a plurality of PUCCH resources on which ACK/NACK can be transmitted and sending a plurality of ACK/NACKs by sending a modulation symbol in any one of the plurality of allocated PUCCH resources.

That is, in the channel selection, the contents of the ACK/NACK are determined by a combination of PUCCH resources used in the ACK/NACK transmission and a QPSK modulation symbol. The following table is an example of ACK/NACK contents determined by used PUCCH resources and 2-bit information indicated by a modulation symbol.

TABLE 5

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 5, HARQ-ACK(i) indicates ACK/NACK for a data unit i (i=0, 1, 2, 3). The data unit may mean a codeword, a transport block, or a PDSCH. DTX indicates that the presence of a data unit has not been detected in a receiving terminal. $n^{(1)}_{PUCCH,x}$ indicates a PUCCH resource used for ACK/NACK transmission. In Table 5, x is one of 0, 1, 2, and 3. UE sends 2-bit (b(0), b(1)) information, identified by a QPSK modulation symbol, in one PUCCH resource selected from a plurality of PUCCH resources. In response thereto, a BS can be aware of whether reception for each data unit is successful or not by a combination of a PUCCH resource on which ACK/NACK has been actually transmitted and a QPSK modulation symbol. For example, if the UE has successfully received and decoded 4 data units, the UE sends 2-bit (1,1) in an $n^{(1)}_{PUCCH,1}$.

In the above-described ACK/NACK bundling or channel selection, the total number of PDSCHs, that is, the subject of ACK/NACK transmitted by UE, is important. If the UE does not receive some of a plurality of PDCCHs for scheduling the plurality of PDSCHs, the UE may send erroneous ACK/NACK because there is an error in the total number of PDSCHs, that is, the subject of ACK/NACK. In order to solve this error, in a TDD system, a Downlink Assignment Index (DAI) is included in a PDCCH and transmitted. The DAI informs a count value obtained by counting the number of PDCCHs for scheduling PDSCHs.

Figure 11:
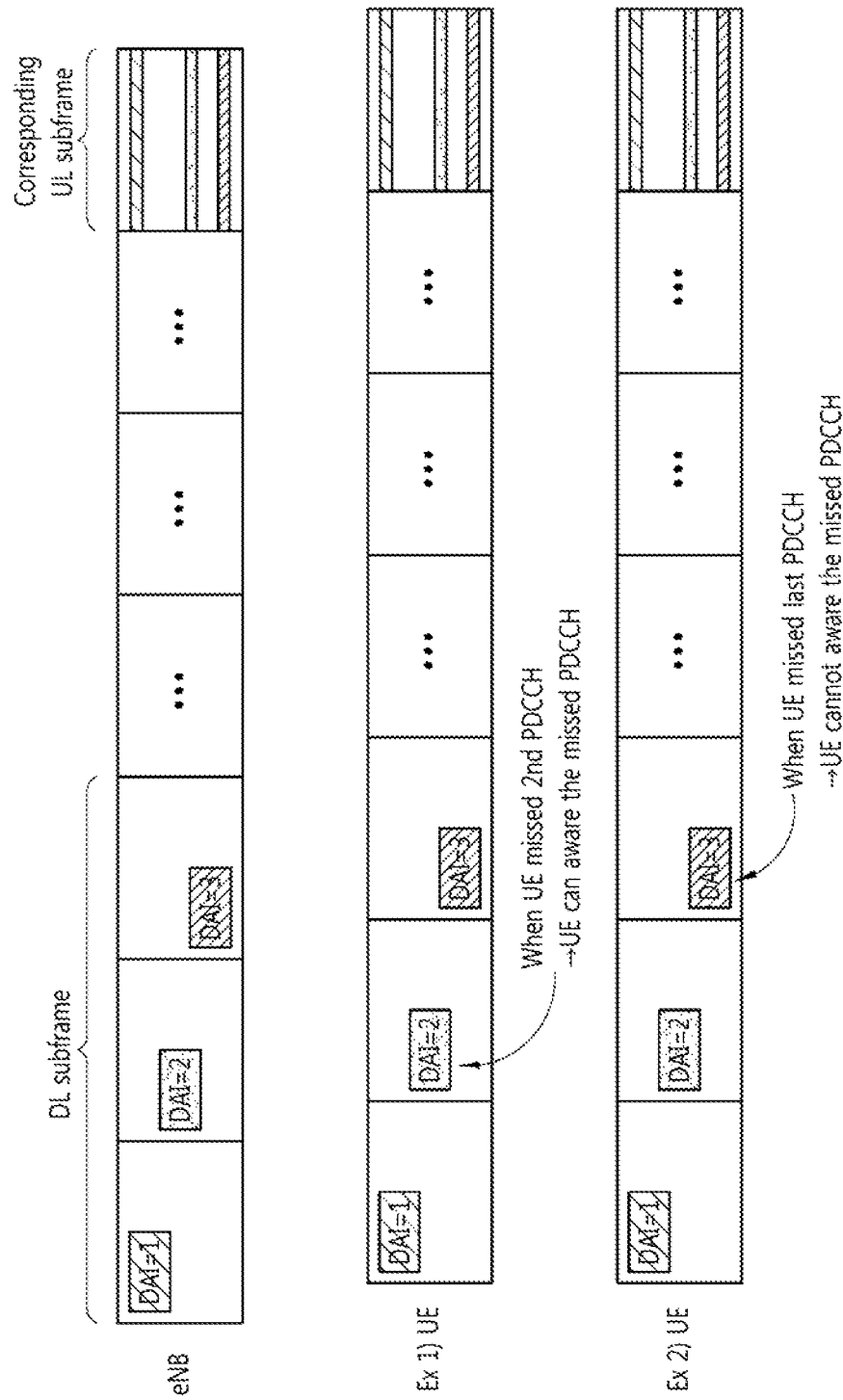
FIG. 11 shows an example in which a DAI is transmitted in a wireless communication system operating in TDD.

FIG. 11 shows an example in which a DAI is transmitted in a wireless communication system operating in TDD.

If one UL subframe corresponds to 3 DL subframes, indices are sequentially assigned to PDSCHs transmitted in 3 DL subframes duration, and DAIs having the indices as count values are loaded onto a PDCCH for a scheduling PDSCHs and then transmitted. Accordingly, UE can be aware of whether previous PDCCHs have been properly received or not through a DAI field included in the PDCCH.

In a first example of FIG. 11, if UE has not received a second PDCCH, it can be aware that the second PDCCH has not been received because the DAI of a third PDCCH is not identical with the number of received PDCCHs.

In a second example of FIG. 11, if UE has not received the last PDCCH, that is, a third PDCCH, the UE is not aware of an error because the number of PDCCHs received until a second PDCCH is identical with a DAI value. However, an eNB is aware that the UE has not received the third PDCCH from the fact that the UE has sent ACK/NACK through a PUCCH resource corresponding to DAI=2 not a PUCCH resource corresponding to DAI=3.

A multiple carrier system is described below.

A 3GPP LTE system supports a case where a downlink bandwidth and an uplink bandwidth are differently configured, but one Component Carrier (CC) is a precondition for the case. A 3GPP LTE system can support a maximum of 20 MHz and have different uplink and downlink bandwidths, but supports only one CC in uplink or downlink.

A Carrier Aggregation (CA) (also called a spectrum aggregation or a bandwidth aggregation) supports a plurality of CCs. For example, if 5 CCs are assigned as the granularity of a carrier unit having a 20 MHz bandwidth, a maximum bandwidth of 100 MHz can be supported.

The system band of a wireless communication system is classified into a plurality of carrier frequencies. Here, the carrier frequency means the center frequency of a cell. Hereinafter, a cell may mean a pair of a DL CC and a UL CC. Or, a cell may mean a combination of a DL CC and an optional UL CC.

In order for a transport block to be transmitted and received through a specific cell, UE first has to complete a configuration for the specific cell. Here, the configuration means the state in which the reception of system information necessary to transmit and receive data to and from the specific cell has been completed. For example, the configuration can include an overall process of receiving common physical layer parameters necessary to send and receive data, MAC layer parameters, or parameters necessary for a specific operation in the RRC layer.

A cell in the configuration-completed state may be present in an activation or deactivation state. Here, the activation refers to the state in which data is being transmitted or received or a ready state. UE can monitor or receive the control channel (PDCCH) and data channel (PDSCH) of an activated cell in order to check resources (the resources may be a frequency, time, etc.) allocated thereto.

Deactivation refers to the state in which the transmission or reception of data is impossible and measurement or the transmission/reception of minimum information is possible. UE does not monitor or receive the control channel (PDCCH) and data channel (PDSCH) of a deactivated cell in order to check resources (the resources may be a frequency, time, etc.) allocated thereto.

A cell can be classified into a primary cell, a secondary cell, and a serving cell.

The primary cell means a cell operating in a primary frequency, a cell through which UE performs an initial connection establishment procedure or a connection re-establishment procedure with an eNB, or a cell indicated as a primary cell in a handover process.

The secondary cell means a cell operating in a secondary frequency. The secondary cell is configured once RRC connection is set up and used to provide additional radio resources.

The serving cell is formed of a primary cell in the case of UE in which a Carrier Aggregation (CA) has not been configured or to which a CA cannot be provided. If a CA has been configured, the term 'serving cell' is used to indicate a primary cell and one of all secondary cells or a set of a plurality of cells.

A set of serving cells configured for one MS may be formed of only one primary cell or may be formed of one primary cell and at least one secondary cell.

A Primary Component Carrier (PCC) means a CC corresponding to a primary cell. The PCC is a CC through which UE forms connection or RRC connection with an eNB at the early stage, from among some CCs. The PCC is a special CC that is responsible for connection or RRC connection for signaling regarding a plurality of CCs and that manages UE context, that is, connection information related to UE. Furthermore, the PCC is always in the activation state when it is in RRC connected mode after setting up connection or RRC connection with UE. A downlink CC (DL CC) corresponding to a primary cell is called a downlink Primary Component Carrier (DL PCC), and an uplink CC (UL CC) corresponding to a primary cell is called an uplink Primary Component Carrier (UL PCC).

A Secondary Component Carrier (SCC) means a CC corresponding to a secondary cell. That is, the SCC is a CC allocated to UE other than a PCC. The SCC is a carrier aggregated for additional resource allocation other than the PCC and can be divided into an activation state and a deactivation state. A DL CC corresponding to a secondary cell is called a downlink Secondary Component Carrier (DL SCC), and an UL CC corresponding to a secondary cell is called an uplink Secondary Component Carrier (UL SCC).

A primary cell and a secondary cell have the following characteristics.

First, a primary cell is used to transmit a PUCCH. Second, a primary cell is always activated, whereas a secondary cell is a carrier that is activated or deactivated according to specific conditions. Third, when a primary cell experiences a Radio Link Failure (hereinafter referred to as an RLF), RRC reconnection is triggered, but a secondary cell does not perform RLM. Fourth, a primary cell can be changed by a change of a security key or by a handover procedure accompanied by a Random Access Channel (RACH) procedure. Fifth, Non-Access Stratum (NAS) information is received through a primary cell. Sixth, a primary cell is always formed of a pair of a DL PCC and an UL PCC. Seventh, a different CC can be configured as a primary cell for each MS. Eighth, procedures, such as the reconfiguration, addition, and removal of a secondary cell, can be performed by the RRC layer. In adding a new secondary cell, RRC signaling can be used to transmit system information about a dedicated secondary cell.

In CCs forming a serving cell, a DL CC may form one serving cell and a DL CC and a UL CC may be subject to connection setup to form one serving cell. However, a serving cell is not formed of only one UL CC.

The activation/deactivation of a CC has the same concept as the activation/deactivation of a serving cell. For example, assuming that a serving cell1 is configured using a DL CC1, the activation of the serving cell1 means the activation of the DL CC1. Assuming that a serving cell2 is configured by setting up connection between a DL CC2 and a UL CC2, the activation of the serving cell2 means the activation of the DL CC2 and the UL CC2. In this sense, each CC can correspond to a cell.

Figure 12:
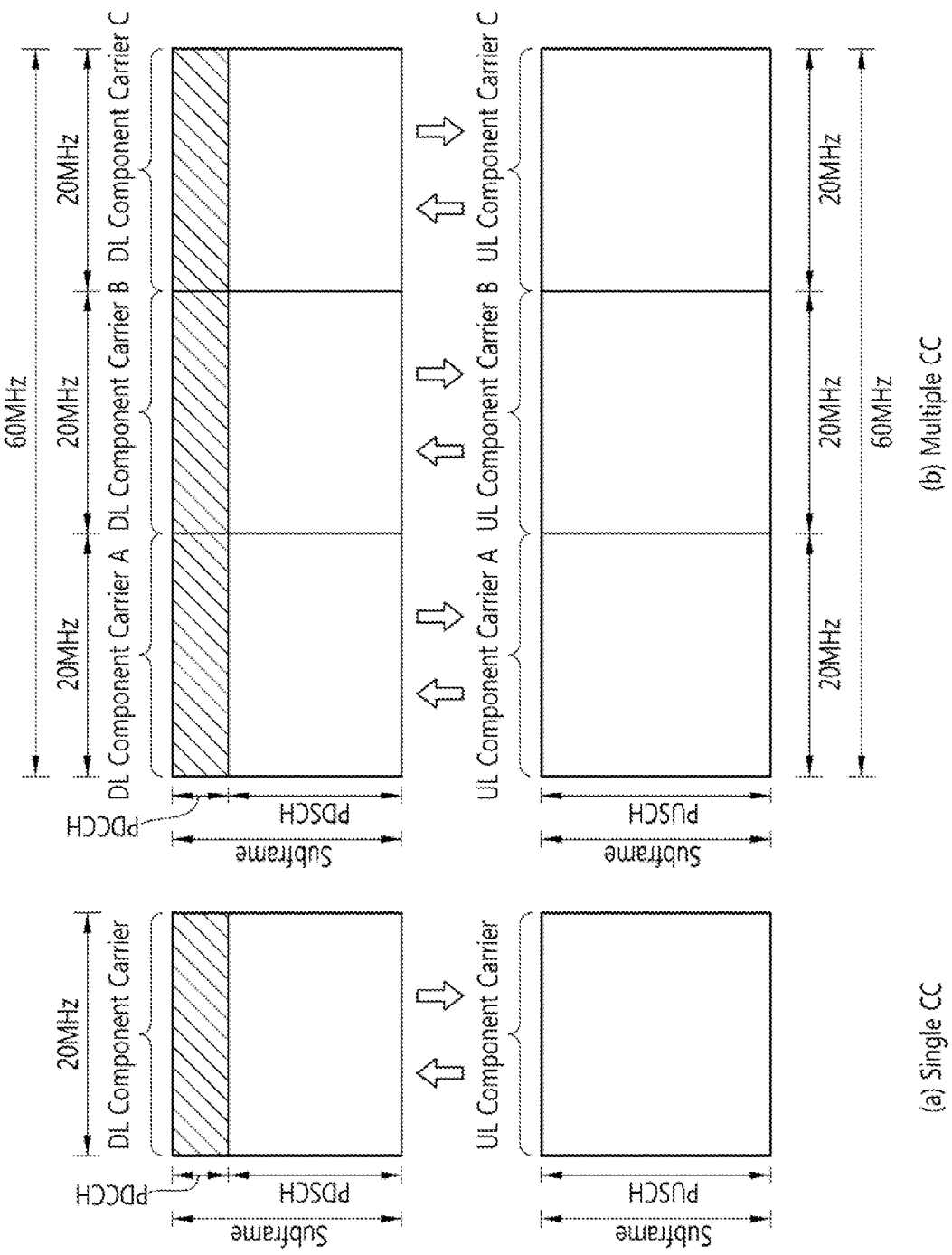
FIG. 12 shows an example in which a single carrier system is compared with a multi-carrier system.

FIG. 12 shows an example in which a single carrier system is compared with a multi-carrier system.

In a single carrier system, such as that shown in FIG. 12(a), only one carrier is supported for UE in uplink and downlink. A carrier may have a variety of bandwidths, but the number of carriers allocated to UE is one. In contrast, in a multi-carrier system, such as that shown in FIG. 12(b), a plurality of CCs DL CCs A to C and UL CCs A to C can be allocated to UE. For example, 3 CCs each having 20 MHz can be allocated to UE in order to allocate a bandwidth of 60 MHz to the UE. In FIG. 12(b), the number of each of the DL CCs and the UL CCs is illustrated as being 3, but the number of each of the DL CCs and the UL CCs is not limited. A PDCCH and a PDSCH are independently transmitted in respective DL CCs, and a PUCCH and a PUSCH are independently transmitted in respective UL CCs. Since a DL CC-UL CC pair is defined to be 3, it can be said that UE is supplied with service from 3 serving cells.

UE can monitor a PDCCH in a plurality of DL CCs and receive downlink transport blocks at the same time through the plurality of DL CCs. UE can send a plurality of uplink transport blocks at the same time through a plurality of UL CCs.

In a multi-carrier system, CC scheduling can include two methods.

In the first method, a PDCCH-PDSCH pair is transmitted in one CC. This CC is called self-scheduling. Furthermore, this means that a UL CC through which a PUSCH is transmitted becomes a CC linked to a DL CC through which a corresponding PDCCH is transmitted. That is, a PDSCH resource is allocated to a PDCCH on the same CC or a PUSCH resource is allocated to the linked UL CC.

In the second method, a DL CC through which a PDSCH is transmitted or a UL CC through which a PUSCH is transmitted is determined irrespective of a DL CC through which a PDCCH is transmitted. That is, the PDCCH and the PDSCH are transmitted through different DL CCs, or the PUSCH is transmitted through a UL CC not linked to a DL CC through which the PDCCH is transmitted. This is called cross-carrier scheduling. A CC through which a PDCCH is transmitted is called a PDCCH carrier, a monitoring carrier, or a scheduling carrier. A CC through which a PDSCH/PUSCH is transmitted is called a PDSCH/PUSCH carrier or a scheduled carrier.

Figure 13:
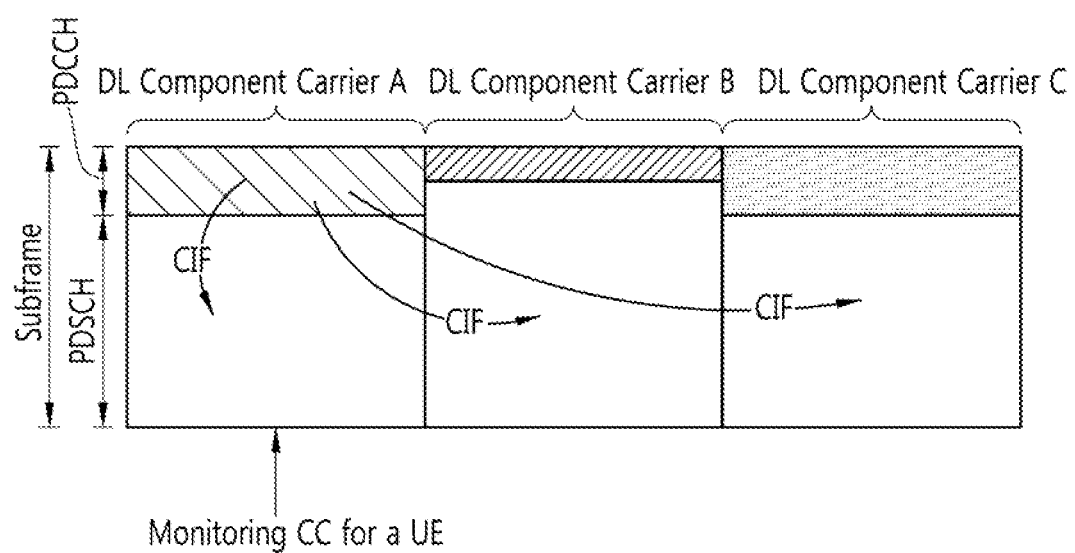
FIG. 13 shows an example of cross-carrier scheduling.

FIG. 13 shows an example of cross-carrier scheduling.

Referring to FIG. 13, 3 DL CCs, such as a DL CC A, a DL CC B, and a DL CC C, are configured for UE. From among the 3 DL CCs, the DL CC A is a monitoring CC in which the UE monitors a PDCCH. The UE receives Downlink Control Information (DCI) about the DL CC A, the DL CC B, and the DL CC C in the PDCCH of the DL CC A. Since the DCI includes a CIF, the UE can identify that the DCI is DCI for what DL CC. The monitoring CC can be a DL PCC, and this monitoring CC can be configured in a UE-specific way or a UE group-specific way.

If a multi-carrier system, such as LTE-A, operates in TDD, a plurality of serving cell, that is, a plurality of CCs, can be configured for UE. The UE can receive a plurality of PDSCHs through the plurality of CCs and send ACK/NACK for the plurality of PDSCHs through a specific UL CC. In this case, the amount of ACK/NACK information that has to be transmitted at the same time in one UL subframe is increased in proportion to the number of aggregated DL CCs. The amount of ACK/NACK information that can be transmitted may be limited depending on a limit to the capacity of a PUCCH format used to send ACK/NACK and a UL channel condition. One method for overcoming this limit is to bundle and send the bundled ACK/NACK without individually sending ACK/NACK depending on each data unit (e.g., a codeword or PDSCH). For example, if UE receives a codeword 0 and a codeword 1 in a DL subframe 1, the UE does not send ACK/NACK information about each of the codewords 0 and 1, but bundles ACK/NACK in such a way as to send ACK if both the codeword 0 and the codeword 1 have been successfully decoded and to send NACK/DTX in other cases.

In the present invention, if UE uses a channel selection scheme based on PUCCH resource selection and the PUCCH format 3 based on a block spreading scheme as a scheme for sending ACK/NACK to an eNB, how the ACK/NACK will be transmitted in a multi-carrier system is described below. Hereinafter, one ACK/NACK is illustrated as indicating whether one codeword has been successfully received or not, but the present invention is not limited thereto. That is, one ACK/NACK may be for a PDCCH that requires an ACK/NACK response. This PDCCH includes a Semi-Persistent Scheduling (SPS) PDCCH.

In LTE, UE can be informed that semi-static transmission/reception will be performed in what subframes through a higher layer signal, such as Radio Resource Control (RRC). Parameters given as the higher layer signal can include the period of a subframe and an offset value.

After recognizing semi-static transmission through the RRC signaling, when an SPS activation or release signal is received through a PDCCH, the UE performs SPS transmission and reception. That is, the UE does not immediately perform SPS transmission and reception although SPS is allocated thereto through the RRC signaling, but performs SPS transmission and reception in a subframe period allocated through the RRC signaling and a subframe corresponding to an offset value by applying a frequency resource according to the allocation of a resource block designated in the PDCCH, modulation according to MCS information, and a coding rate to the SPS transmission and reception in response to the SPS activation or release signal received through the PDCCH. If the SPS release signal is received through the PDCCH, the UE stops SPS transmission and reception. The UE restarts the stopped SPS transmission and reception by using a frequency resource designated in a PDCCH including an SPS activation signal and an MCS when the PDCCH is received again. A PDCCH for SPS configuration/release is called an SPS PDCCH.

In an existing LTE TDD system using one carrier, UE sends a plurality of ACK/NACKs in one uplink subframe in relation to a plurality of PDSCHs received in a plurality of downlink subframes. The channel selection can be used as a method of sending the plurality of ACK/NACKs. As described above, the channel selection is a method of allocating a plurality of PUCCH resources through which ACK/NACKs can be transmitted and sending the ACK/NACKs in one of the plurality of PUCCH resources as modulation symbols.

Here, the plurality of allocated PUCCH resources uses PUCCH resources corresponding to PDCCH resources for scheduling respective PDSCHs. More particularly, a PUCCH resource linked to the lowest CCE index in which a PDCCH is transmitted is allocated. Accordingly, the PUCCH resource is not explicitly given, but is implicitly indicated by the PDCCH.

In the next-generation system, such as LTE-A, unlike in LTE, a plurality of CCs can be aggregated and used. If a plurality of CCs is configured for UE, the UE has to send ACK/NACK for a plurality of PDSCHs received through the plurality of CCs. As a result, the amount of ACK/NACK information that has to be transmitted is more increased than that of an existing LTE.

A CC (i.e., a serving cell) configured for UE is semi-statically configured through a higher layer signal, such as RRC. Furthermore, a CC configured for UE can be changed and reconfigured. Here, ambiguity regarding ACK/NACK transmission can occur between an eNB and the UE.

Figure 14:
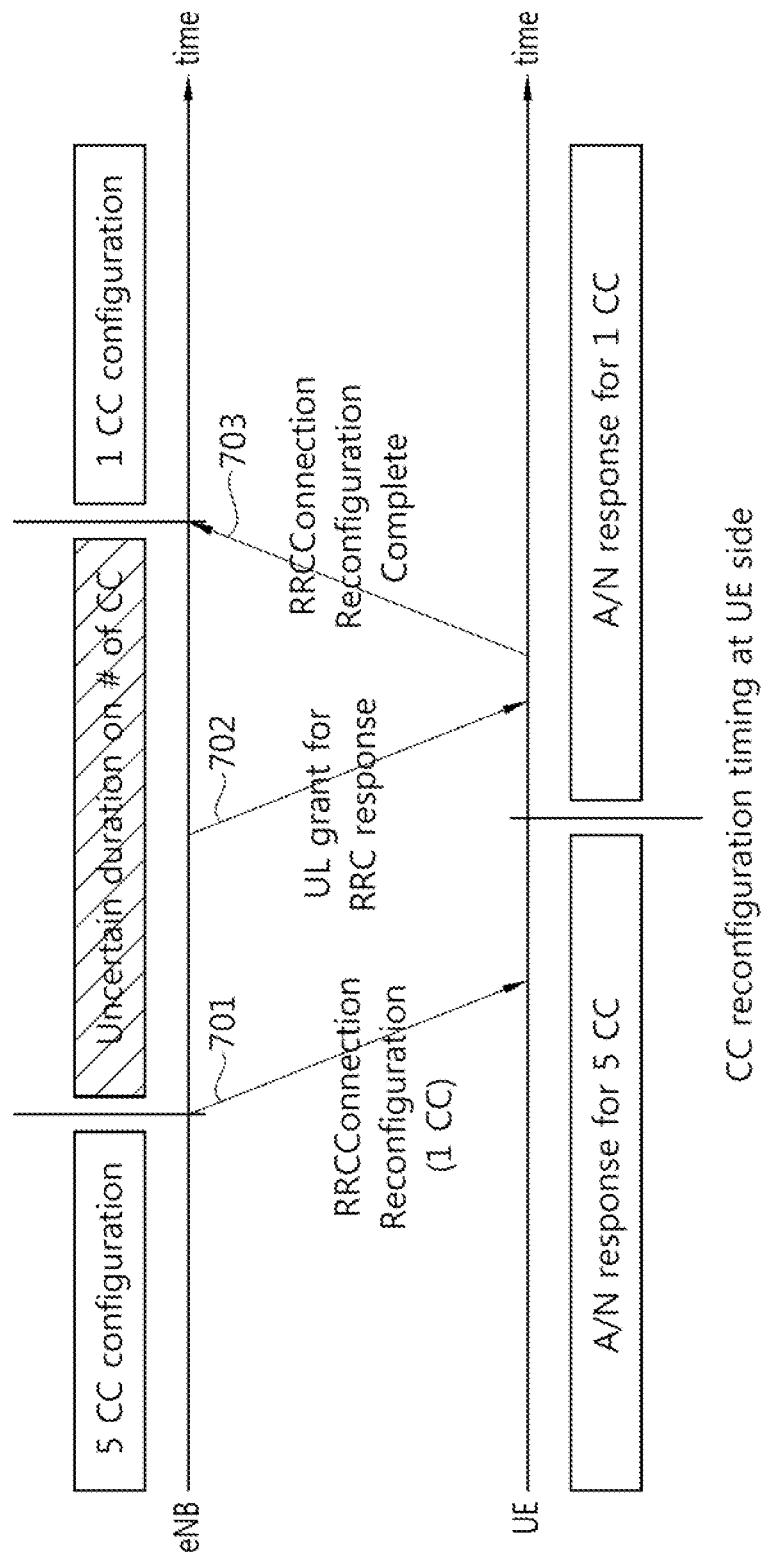
FIG. 14 illustrates an operation of a BS and UE in a CC reconfiguration period.

FIG. 14 illustrates an operation of a BS and UE in a CC reconfiguration period.

Referring to FIG. 14, the BS sends an RRC connection reconfiguration message to the UE (701). For example, the BS can change the state in which 5 CCs have been configured for the UE into the state in which only 1 CC has been configured for the UE by sending the RRC connection reconfiguration message. The BS sends a UL grant for an RRC response to the UE (702). The UE sends an RRC connection reconfiguration-complete message to the BS (703).

In this operating process, the BS can be aware that the UE has successfully changed the CC configuration only when the BS receives the RRC connection reconfiguration-complete message. Accordingly, ambiguity may occur between a point of time at which the BS sent the RRC connection reconfiguration signal and a point of time at which the BS receives the RRC connection reconfiguration-complete message from the UE. For example, the UE may not receive the RRC connection reconfiguration message. In this case, an error may occur because the UE still recognizes that the 5 CCs have been configured and sends ACK/NACK for the 5 CCs, whereas the BS expects ACK/NACK for the 1 CC. There is a need for a method for solving this problem.

Figure 15:
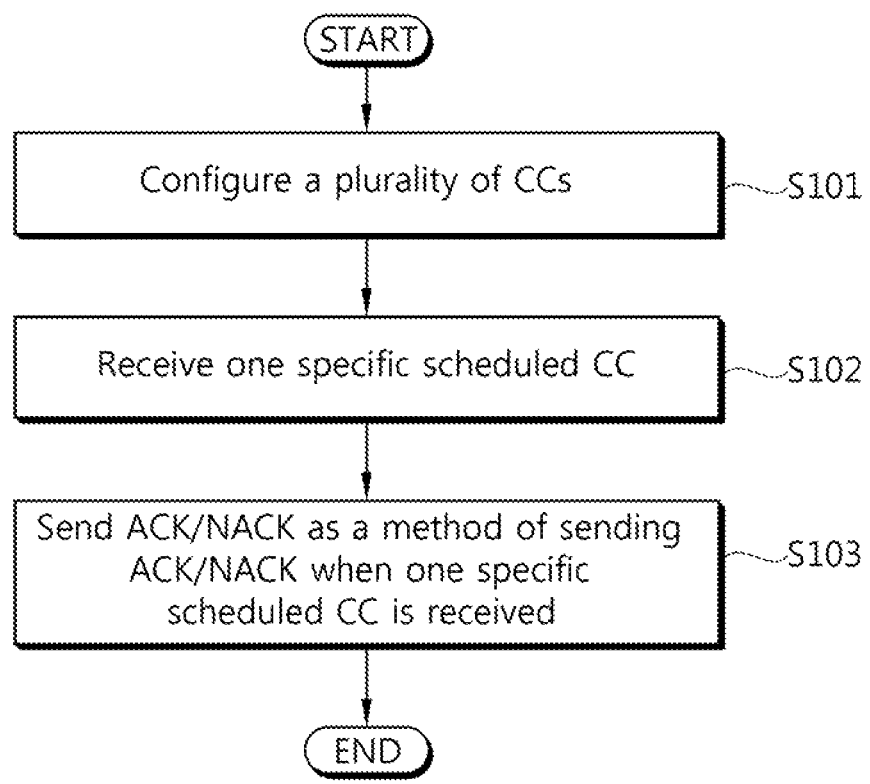
FIG. 15 shows a method of UE sending ACK/NACK in accordance with an embodiment of the present invention.

FIG. 15 shows a method of UE sending ACK/NACK in accordance with an embodiment of the present invention.

Referring to FIG. 15, a plurality of CCs that can be scheduled is configured for the UE (S101). A specific one of the plurality of CCs configured for the UE can be scheduled (S102). The specific CC can be a PCC. The UE sends ACK/NACK for the specific CC according to an ACK/NACK transmission method used when only one CC has been configured (S103).

That is, if one CC, for example, only a PCC has been scheduled in the state in which a plurality of CCs that can be scheduled has been configured for the UE, the UE sends ACK/NACK for the PCC according to an ACK/NACK transmission method used when only one CC has been configured.

In accordance with this method, the BS schedules a PDSCH only in a specific CC for the UE irrespective of a CC configuration in a period in which the ambiguity of FIG. 14 may occur (e.g., between a point of time at which the RRC connection reconfiguration message is sent and a point of time at which the RRC connection reconfiguration-complete message is received). In this case, the UE uses an ACK/NACK transmission method used when only one CC has been configured irrespective of the number of configured CCs. Accordingly, ambiguity can be removed, and the certainty of ACK/NACK transmission can be increased irrespective of the number of configured CCs.

Figure 16:
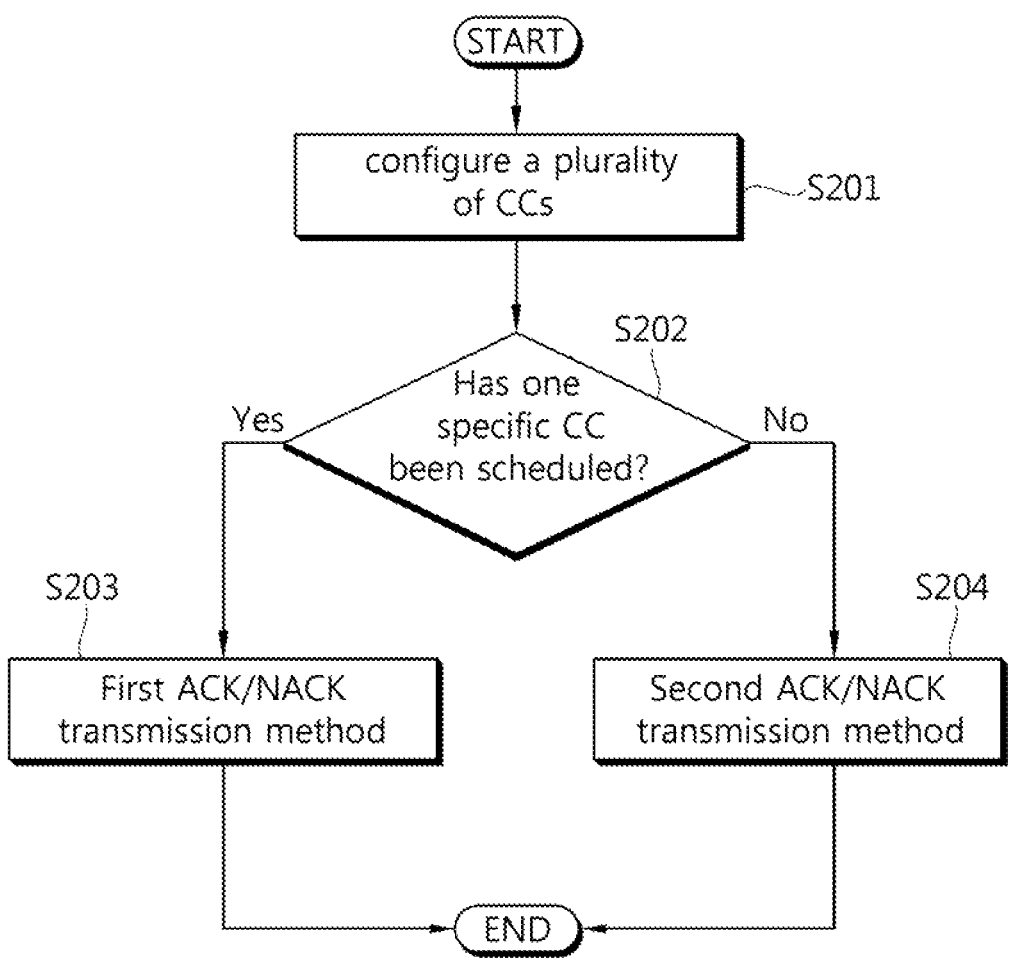
FIG. 16 shows a method of UE sending ACK/NACK in accordance with another embodiment of the present invention.

FIG. 16 shows a method of UE sending ACK/NACK in accordance with another embodiment of the present invention.

Referring to FIG. 16, a plurality of CCs has been configured for the UE (S201). Whether only one specific CC of the plurality of CCs has been scheduled for the UE or not is determined (S202). If only one specific CC has been scheduled, the UE sends ACK/NACK according to a first ACK/NACK transmission method (S203). In other cases, the UE sends ACK/NACK according to a second ACK/NACK transmission method (S204). Here, different transmission resources and different transmission schemes can be used in the first ACK/NACK transmission method and the second ACK/NACK transmission method.

That is, the UE uses different ACK/NACK transmission methods in a case where only one specific CC has been scheduled and in other cases in the state in which a plurality of CCs has been configured.

Examples in which the ACK/NACK transmission method described with reference to FIGS. 15 and 16 is applied are described below.

(1) Channel Selection in TDD

In LTE-A TDD, if ACK/NACK is sent according to the channel selection, a maximum of 4-bit information can be transmitted. The ACK/NACK can be independently transmitted as one bit per codeword. Accordingly, if the number of codewords in downlink subframes corresponding to one uplink subframe exceeds 4, the amount of ACK/NACK information that can be transmitted is exceeded. In this case, bundling in which the codewords are grouped and ACK/NACK for the corresponding group is transmitted can be used. Here, the bundling of the ACK/NACK may mean a binary AND operation performed on the ACK/NACK and also a method of compressing bits necessary for each ACK/NACK transmission for the codeword and sending the compressed bits. For example, a method of counting each ACK response number to the codewords and sending the counted number or counting only the number of contiguous ACK responses and sends the counted number can be included in the bundling of the ACK/NACK. The bundling includes space bundling, CC region bundling, and time domain bundling. The space bundling (or space region bundling) means that bundling is performed on a plurality of codewords received in one DL subframe within a specific CC. The CC region bundling means that ACK/NACK for a plurality of codewords received in the same subframe of different CCs configured for UE is bundled. The time domain bundling means that bundling is performed on ACK/NACK for data units received by UE in different DL subframes.

EXAMPLE: 1-1

CC Region Bundling

Figure 17:
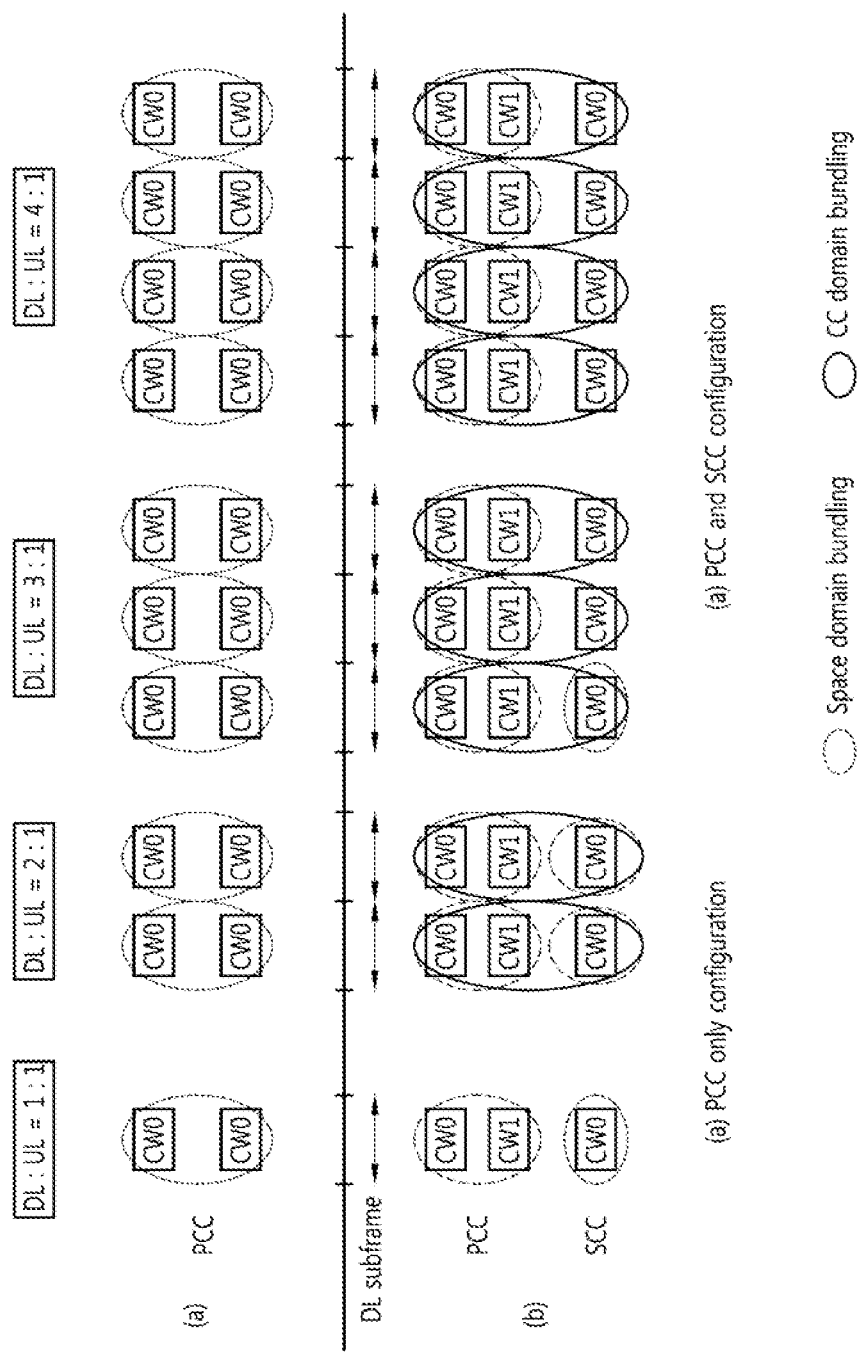
FIG. 17 shows an example of the space bundling and CC region bundling of ACK/NACK.

FIG. 17 shows an example of the space bundling and CC region bundling of ACK/NACK. In all the following drawings, DL:UL indicates a ratio of downlink subframes corresponding to one uplink subframe.

Referring to FIG. 17(a), in a PCC, 2 codewords can be transmitted in one downlink subframe. In this case, for example, in the case of DL:UL=3:1, ACK/NACK for 6 codewords has to be transmitted in one uplink subframe. In this case, the space bundling is performed because the 6 codewords exceeds 4 bits, that is, a maximum transmission amount. That is, if both the 2 codewords have been successfully received and decoded in each downlink subframe, bundling is performed on ACK and, in other cases, on NACK. In this case, one ACK/NACK bit is generated for each downlink subframe, and a total amount of information becomes 3 bits.

Referring to FIG. 17(b), in a PCC, 2 codewords are transmitted and in an SCC, only one codeword is transmitted in one downlink subframe. In the case of DL:UL=3:1, UE may have to send ACK/NACK for a total of 9 codewords in one uplink subframe. If a maximum transmission amount is exceeded as described above, UE performs the space bundling on the PCC. If the maximum transmission amount is exceeded even by the space bundling, the CC region bundling is performed. That is, ACK/NACK bundling is performed on codewords received through a PCC and an SCC in one downlink subframe.

If the space bundling and the CC region bundling are performed on all the codewords (or PDSCHs) scheduled in the same downlink subframe as in FIG. 17(b), the same PUCCH resource, the same ACK/NACK mapping, and the same number of ACK/NACK bits, as those the space region bundling is performed when only a PCC is configured as in FIG. 17(a), can be performed and transmitted.

If only a PCC has been scheduled, UE uses a PUCCH resource corresponding to a PDCCH for scheduling PDSCHs transmitted in the PCC. If both a PCC and an SCC have been scheduled, UE preferentially uses a PUCCH resource corresponding to a PDCCH for scheduling a PDSCH transmitted in the PCC. If only an SCC has been scheduled, UE uses a PUCCH resource corresponding to a PDCCH for scheduling a PDSCH transmitted in the SCC.

Or, if only a PCC has been scheduled, UE does not use the channel selection, but can bundle ACK/NACK information or count the number of ACKs and send ACK/NACK information through an additional resource not used in the channel selection. Here, the PUCCH formats 1/1a/1b can be used.

EXAMPLE: 1-3

PUCCH Resource Selection Through Explicit Indication

If only a PCC has been scheduled, the allocation of ACK/NACK transmission resources and a transmission scheme may vary depending on the number of CCs configured for UE. In order to prevent this problem, a BS can explicitly instruct that the same ACK/NACK transmission resource allocation and the same transmission scheme be used.

For example, it is assumed that cross-carrier scheduling is not used, but the CC region bundling is performed. Here, only a PCC may have been configured for UE, or a plurality of CCs may have been configured for the UE. If a plurality of CCs has been configured for UE, but only a PCC has been scheduled for the UE, a BS may explicitly instruct the UE to use the same ACK/NACK transmission scheme and transmission resource as those in the case where only one CC has been configured.

EXAMPLE: 1-4

Explicit Indication Using a DAI

In LTE TDD, a 2-bit DAI field is included in a PDCCH for scheduling PDSCHs in preparation for a case where the PDCCH is not received when the bundling scheme is used. In the case of the space bundling, a DAI may be unnecessary because bundling between codewords scheduled in one PDCCH is performed. In the case of the CC region bundling and the time domain bundling, a DAI is necessary. If 2 CCs or 2 subframes are sought to be bundled, an error when a PDCCH is not received can be solved only through 1 bit. Explicit indication, such as Example: 1-3, can be performed by using bits not used in a DAI. In this case, a PDCCH resource can be efficiently used because the same length as that of an existing PDCCH format can be maintained.

(2) Method using the PUCCH Format 3 in TDD

In LTE-A, a plurality of ACK/NACKs can be transmitted because the PUCCH format 3 has been introduced. An example in which the present invention is applied when UE uses the PUCCH format 3 as a basic ACK/NACK transmission method if a plurality of CCs has been configured is described below.

EXAMPLE: 2-1

In a TDD system including 4 downlink subframes corresponding to one UL subframe, if UE sends ACK/NACK by using the PUCCH format 3, the UE can send the total amount of 48-bit information. The amount of ACK/NACK information may vary depending on the number of CCs configured for UE. If the PUCCH format 3 is identically used irrespective of the number of CCs, there is a problem in that a codebook is changed. For example, TDD including four downlink subframes corresponding to one uplink subframe for one CC is assumed. Here, if 5 CCs are configured for UE and a maximum 1 codeword is transmitted in each of the 5 CCs, a total of 20-bit ACK/NACK has to be transmitted in the uplink subframe. In contrast, if 1 CC is configured for UE and only one codeword can be transmitted in the corresponding CC, a total of 4-bit ACK/NACK has to be transmitted. In this case, if 5 CCs have been configured, codebooks (multiple CC codebooks) having a code rate of 20/48 are used. If one CC has been configured for UE, a codebook (a single CC codebook) having a code rate of 4/48 is used.

If the method described with reference to FIG. 15 is used, the UE has to use a codebook having the same code rate and use the same PUCCH resource as those when only a specific CC is scheduled and only one CC is configured although a plurality of CCs has been configured for the UE. This means that the UE has to use a different codebook depending on the number of CCs scheduled when a plurality of CCs is configured.

However, for example, a BS has scheduled both a PCC and an SCC for UE, but the UE does not receive scheduling information about the SCC. In preparation for this, the BS may allocate different PUCCH resources when multiple CC codebooks are used and when a single CC codebook is used. In this case, the BS can perform decoding by using a codebook corresponding to a PUCCH resource detected by monitoring 2 PUCCH resources.

EXAMPLE: 2-2

UE falls back to an existing channel selection scheme if only a PCC has been scheduled in LTE-A in which a plurality of CCs has been configured. In contrast, if both a PCC and an SCC have been scheduled, the UE uses the PUCCH format 3.

A BS needs to monitor both a PUCCH resource according to the channel selection and a PUCCH resource according to the PUCCH format 3 in preparation for a case where UE does not receive a PDCCH for an SCC although both a PCC and the SCC have been scheduled for the UE.

EXAMPLE: 2-2-1

It is assumed that an ACK/NACK transmission scheme used when only one CC is configured for UE is called a first transmission scheme. If a plurality of CCs has been configured for the UE and only a PCC has been scheduled for the UE, the UE sends ACK/NACK for the PCC according to the channel selection method irrespective of the first transmission scheme. In other cases, the UE sends ACK/NACK by using the PUCCH format 3.

Or, if a plurality of CCs has been configured for UE and only a PCC has been scheduled for the UE, the UE can bundle ACK/NACK or count the number of ACKs and send ACK/NACK through the PUCCH formats 1/1a/1b. In other cases, the UE uses the PUCCH format 3. To this end, a BS can include a DAI in scheduling information in preparation for a case where scheduling has been actually performed, but the UE does not receive the scheduling information (or a scheduling grant). For example, the number of PDSCHs scheduled in a PCC can be counted, the counted number can be included in the DAI of a PDCCH for scheduling a PCC, and the DAI can be transmitted.

If the time domain bundling or the CC region bundling is used in an SCC, in the case of the time domain bundling, the number of PDSCHs scheduled within a bundling window is counted, included in a scheduling grant for the SCC, and then transmitted. In the case of the CC region bundling, the total number of PDSCHs scheduled within a bundling window to which a PDSCH scheduled by a corresponding grant belongs is included in the scheduling grant of the SCC and then transmitted through a DAI.

A DAI included in a scheduling grant can be count information about the number of PDSCHs transmitted through all DL CC/downlink subframes corresponding to one uplink subframe for full bundling. If only a PCC has been scheduled for UE, the UE can perform bundling on only a PDSCH transmitted in the PCC or send a value obtained by performing bundling on all PDSCHs.

EXAMPLE: 2-3

Selection of Transmission Scheme Through Explicit Indication

In the case of Example: 2-1, a BS has to allocate mutually exclusive resources to UE and monitor all the exclusive resources. In the case of Example: 2-2, a BS has to allocate resources according to the channel selection method and resources for the PUCCH format 3 at the same time and monitor all the allocated resources. In this case, the complexity of the BS can be increased. Accordingly, in Example: 2-1, the BS can directly indicate a codebook to be used by UE through a scheduling PDCCH. The scheduling PDCCH means a PDCCH on which information for scheduling PDSCHs is transmitted. In this case, the BS and the UE can avoid a detection error although one resource according to the PUCCH format 3 is used using the same codebook.

In the case of Example: 2-2, a BS can directly indicate a PUCCH transmission scheme to be used by UE through a scheduling PDCCH. In this case, since the PUCCH transmission scheme used between the BS and the UE is always the same, the BS has only to monitor only the indicated PUCCH transmission scheme. Resources according to not-used transmission schemes can be allocated to other UEs.

EXAMPLE: 2-4

Explicit Indication Using DAI

A 2-bit DAI is included in a PDCCH for scheduling PDSCHs in preparation for a case where UE misses the PDCCH when the bundling scheme is used in LTE TDD. In the case of the space bundling, however, a DAI is not necessary because bundling is performed between codewords scheduled in one PDCCH. A DAI is necessary only in the CC region bundling and the time domain bundling. In the case of a bundling window including 2 CCs or 2 subframes, an error when a PDCCH is missed can be avoided by using only 1 bit.

Explicit indication, such as Example: 2-3, can be performed using bits not used, from among bits used as a DAI. In the DAI, the details of Example: 2-3 can be indicated using one bit. Or, a total of 4 states can be indicated using two bits in the DAI. For example, if scheduling is performed through an SCC in a multiple CC configuration, whether the space bundling using the PUCCH format 3 will be applied or not, whether a codebook used when only a PCC is configured will be used or not when only a PCC is scheduled in a multiple CC configuration, and a PUCCH transmission scheme can be indicated.

An ACK/NACK transmission method of UE when an SPS PDSCH and an SPS release PDCCH are included is described below.

If a plurality of DL CCs that can be scheduled for UE has been configured, the UE can use a different ACK/NACK transmission method depending on the number of scheduled DL CCs and the number of PDSCHs in the DL CCs. For example, if one PDSCH has been scheduled only in a specific DL CC (i.e., a PCC) in the state in which a plurality of DL CCs has been configured, UE sends ACK/NACK by using the PUCCH formats 1/1a/1b. Here, a general dynamic PDSCH scheduled through a PDCCH is described as an example, but the present invention can also be applied to a case where an SPS PDSCH scheduled according to SPS and a PDCCH indicative of an SPS release are scheduled only in a specific DL CC. In the case of a dynamic PDSCH or an SPS release PDCCH, UE sends ACK/NACK through a PUCCH resource corresponding to a CCE occupied by the corresponding PDCCH. In the case of an SPS PDSCH, UE sends ACK/NACK through a PUCCH resource configured by RRC.

In other cases, UE can send ACK/NACK by using the PUCCH format 3. That is, if two or more PDSCHs (including a dynamic PDSCH and an SPS PDSCH) are scheduled or two or more SPS release PDCCHs are received in a PCC or if one or more PDSCHs are scheduled in an SCC, UE can send ACK/NACK by using the PUCCH format 3. If the PUCCH format 3 is used, an offset value for resources allocated through RRC or a value for selecting one of a plurality of allocated resources can be given through an ACK/NACK Resource Indicator (ARI).

Although a BS has actually transmitted the two or more PDSCHs or SPS release PDCCHs in the PCC, the UE may not receive some of the two or more PDSCHs or SPS release PDCCHs. In this case, the UE may misunderstand the number of scheduled PDSCHs or SPS release PDCCH. In order to prevent this problem, if a PDSCH is scheduled or a PDCCH indicative of an SPS release is transmitted in a PCC, it is necessary to send information about a sequence value in a DAI.

If SPS is not applied and a PDSCH or SPS release is directly scheduled in a PDCCH, the lowest sequence value of the sequence values of the PDCCH that can be included in a DAI is used to schedule a first PDSCH. For example, if a sequence value starts from 0, a PDCCH including the sequence value of 0 is used to schedule a first PDSCH. If a sequence value starts from 1, a PDCCH including the sequence value of 1 is used to schedule a first PDSCH.

If a value of a DAI is not the lowest sequence value when a PDCCH is received, UE can determine that a plurality of PDSCHs (or indicating an SPS release) or PDCCHs has been transmitted. Here, in order to use the PUCCH format 3, it is necessary to inform an ARI, that is, resource allocation information, through the PDCCH. A TPC field can be used as the ARI.

If SPS is applied to a PCC and an SPS PDSCH scheduled according to the SPS is present in a downlink subframe interval corresponding to an UL CC through which ACK/NACK is transmitted, the SPS PDSCH is not directly dynamically scheduled by the PDCCH. Accordingly, since BS can't inform an ARI or TPC information, there is a problem in that UE selects the resources of the PUCCH format 3. A method of solving this problem is described below.

1. A sequence value transmitted in a PDCCH can count only a dynamic PDSCH other than an SPS PDSCH or an SPS release PDCCH within a downlink subframe interval corresponding to an UL CC through which ACK/NACK is transmitted. If an SPS PDSCH is not present within a downlink subframe interval corresponding to an UL CC through which ACK/NACK is transmitted, a value of the TPC field of a PDCCH including the lowest sequence value is used/interpreted as its original use. If an SPS PDSCH is present within a downlink subframe interval corresponding to an UL CC through which ACK/NACK is transmitted, a value of the TPC field of a PDCCH through which the lowest sequence value is transmitted is used/interpreted as a value of an ARI.

In the case of a PDCCH through which a sequence value other than the lowest sequence value is transmitted, a TPC field value is interpreted as an ARI irrespective of whether an SPS PDSCH is present or not.

Exceptionally, if dynamic PDSCH overriding is scheduled by a PDCCH including the lowest sequence value, a TPC field value can be used/interpreted as a TPC because a value of an ARI is not necessary in the corresponding PDCCH. The dynamic PDSCH overriding means that a dynamic PDSCH is scheduled by a PDCCH in a downlink subframe reserved so that an SPS PDSCH is transmitted in the downlink subframe.

2. A sequence value transmitted in a PDCCH can be determined so that it includes an SPS PDSCH within a downlink subframe interval corresponding to an UL CC through which ACK/NACK is transmitted. Here, a sequence value can be implicitly allocated to the SPS PDSCH starting from the lowest sequence value. Accordingly, only when the SPS PDSCH is not present, the lowest sequence value can be transmitted in the PDCCH. Only the TPC field of the PDCCH in which the lowest sequence value is transmitted is used/interpreted as a transmit power control use, values of the TPC fields of other PDCCHs are used/interpreted as ARI values.

3. When dynamic PDSCH overriding occurs in LTE, UE recognizes that the transmission of an SPS PDSCH scheduled in a corresponding downlink subframe has been cancelled and receives a dynamic PDSCH. When this dynamic PDSCH overriding is applied to LTE-A, a BS has expected an operation without the SPS PDSCH by attempting the dynamic PDSCH overriding, but the UE may miss a PDCCH for scheduling the dynamic PDSCH. In this case, the UE misunderstands that the SPS PDSCH is still transmitted. In this case, there may be a problem in interpreting a TPC field included in the PDCCH for scheduling the dynamic PDSCH. The following methods may be taken into consideration in order to solve the problem.

3-1. If the PUCCH format 3 in which an ARI must be used in relation to explicit ACK/NACK resources allocated through RRC has been configured to be used, dynamic PDSCH overriding is not permitted.

3-2. A sequence value transmitted in a PDCCH counts only a dynamic PDSCH or an SPS release PDCCH directly scheduled by a PDCCH not an SPS PDSCH within a downlink subframe interval corresponding to an UL CC through which ACK/NACK is transmitted. Furthermore, if a downlink subframe configured so that an SPS PDSCH is transmitted through the downlink subframe is not present in a downlink subframe interval corresponding to an UL CC through which ACK/NACK is transmitted, the TPC field of a PDCCH in which the lowest sequence value is transmitted is used/interpreted as the original use (i.e., transmit power control). In contrast, if a downlink subframe configured so that an SPS PDSCH is transmitted through the downlink subframe is present in a downlink subframe interval corresponding to an UL CC through which ACK/NACK is transmitted, the TPC field of a PDCCH in which the lowest sequence value is transmitted is used/interpreted as an ARI.

In the case of a PDCCH in which a sequence value other than the lowest sequence value is transmitted, a TPC field is used/interpreted as an ARI irrespective of whether a downlink subframe configured so that an SPS PDSCH is transmitted through the downlink subframe is present or not.

Exceptionally, if dynamic PDSCH overriding has been scheduled by a PDCCH including the lowest sequence value, a TPC field value is used/interpreted as the original use (i.e., transmit power control) because an ARI value is not necessary in the corresponding PDCCH.

3-3. It is assumed that a downlink subframe configured so that an SPS PDSCH is transmitted through the downlink subframe is present within a downlink subframe interval corresponding to an UL CC through which ACK/NACK is transmitted. Here, if a PDSCH is allocated to UE only through a PDCCH including the lowest sequence value, the UE uses the resources of the PUCCH format 1a/1b corresponding to a CCE occupied by the corresponding PDCCH. The UE performs the space bundling on ACK/NACK for the PDSCH scheduled by the PDCCH including the lowest sequence value and maps the ACK/NACK to a location on an ACK/NACK signal constellation for a codeword 0. If a PDSCH scheduled by a PDCCH not including the lowest sequence value is present, the UE uses the PUCCH format 3.

Furthermore, if an SPS PDSCH is present, the UE maps ACK/NACK for the SPS PDSCH to a location on an ACK/NACK signal constellation for a codeword 1 and sends the mapped ACK/NACK.

3-4. In the case of the above-described 3-2, if there is mismatch between UE and a BS in the transmission and reception of an SPS activation/release, there may be an error in recognition about whether a subframe in which an SPS PDSCH is transmitted has been configured or not. If there is an error in the recognition, there may be a problem in interpreting a TPC field. The UE may differently operate depending on whether an SPS-C-RNTI has been allocated or not because the SPS-C-RNTI has to be allocated to the UE for SPS scheduling.

3-4-1. A sequence value transmitted in a PDCCH counts only a dynamic PDSCH directly scheduled by a PDCCH other than an SPS PDSCH or an SPS release PDCCH within a within a downlink subframe interval corresponding to an UL CC through which ACK/NACK is transmitted.

If an SPS-C-RNTI has not been allocated, a value of the TPC field of a PDCCH in which the lowest sequence value is transmitted is used/interpreted as its original use. If an SPS-C-RNTI has been allocated, a value of the TPC field of a PDCCH in which the lowest sequence value is transmitted is used/interpreted as an ARI.

In the case of a PDCCH in which a sequence value other than the lowest sequence value is transmitted, a value of the TPC field of the PDCCH is used/interpreted as an ARI irrespective of whether an SPS-C-RNTI is present or not.

Exceptionally, if dynamic PDSCH overriding has been scheduled by a PDCCH including the lowest sequence value, a value of the TPC field of the PDCCH is used/interpreted as its original use because an ARI value is not necessary in the corresponding PDSCH.

3-4-2. A sequence value transmitted in a PDCCH counts only a dynamic PDSCH other than an SPS PDSCH or an SPS release PDCCH within a downlink subframe interval corresponding to an UL CC through which ACK/NACK is transmitted. If an SPS-C-RNTI has not been allocated, a value of the TPC field of a PDCCH in which the lowest sequence value is transmitted is used/interpreted as its original use (TPC), and a value of the TPC field of a PDCCH in which a different sequence value is transmitted is used/interpreted as an ARI. Furthermore, if an SPS-C-RNTI has not been allocated, ACK/NACK is deployed according to a sequence value.

In contrast, if an SPS-C-RNTI has been allocated and a PDSCH is allocated to UE through a PDCCH including the lowest sequence value, the UE uses the resources of the PUCCH format 1a/1b corresponding to a CCE occupied by the corresponding PDCCH, performs the space bundling on ACK/NACK for the PDSCH scheduled by the PDCCH including the lowest sequence value and maps the ACK/NACK to a location on an ACK/NACK signal constellation for a codeword 0. If a PDSCH scheduled by a PDCCH not including the lowest sequence value is present, the UE uses the PUCCH format 3. In addition, if an SPS PDSCH is present, the UE maps ACK/NACK for the SPS PDSCH to a location on an ACK/NACK signal constellation for a codeword 1.

3-5. An operation in which an SPS activation/release is always taken into consideration irrespective of whether an SPS-C-RNTI has been allocated or not by taking an error in the configuration of the SPS-C-RNTI into consideration is applied.

3-5-1. A sequence value transmitted in a PDCCH counts only a dynamic PDSCH other than an SPS PDSCH or an SPS release PDCCH within a downlink subframe interval corresponding to an UL CC through which ACK/NACK is transmitted. A value of the TPC field of a PDCCH in which the lowest sequence value is transmitted is used/interpreted as an ARI. In the case of a PDCCH in which a sequence value other than the lowest sequence value is transmitted, a value of the TPC field of the PDCCH is used/interpreted as an ARI. Exceptionally, if dynamic PDSCH overriding has been scheduled by a PDCCH including the lowest sequence value, a value of the TPC field of the PDCCH is used as its original use because an ARI value is not necessary in the corresponding PDCCH.

3-5-2. A sequence value transmitted in a PDCCH counts only a dynamic PDSCH other than an SPS PDSCH and an SPS release PDCCH within a downlink subframe interval corresponding to an UL CC through which ACK/NACK is transmitted. If a PDSCH has been allocated to UE through a PDCCH including the lowest sequence value, the UE uses the resources of the PUCCH format 1a/1b corresponding to a CCU occupied by the corresponding PDCCH, performs the space bundling on ACK/NACK for the PDSCH, and maps the ACK/NACK on a location on an ACK/NACK signal constellation for a codeword 0. If a PDSCH scheduled by a PDCCH not including the lowest sequence value is present, the UE uses the PUCCH format 3. If an SPS PDSCH is present, the UE maps ACK/NACK for the SPS PDSCH on a location on an ACK/NACK signal constellation for a codeword 1.

Meanwhile, the following methods can be taken into consideration when two or more SPS PDSCHs are present within a downlink subframe interval corresponding to an UL CC through which ACK/NACK is transmitted.

1. If two or more SPS PDSCHs are present within a downlink subframe interval corresponding to an UL CC through which ACK/NACK is transmitted, a value of an ARI is used/interpreted as 0. It is not necessary to instead use the TPC field or the DAI field of a PDCCH for scheduling a PCC as a value of the ARI.

2. Only when two or more SPS PDSCHs are present within a downlink subframe interval corresponding to an UL CC through which ACK/NACK is transmitted, if UE recognizes that another PDSCH have not been scheduled for the UE, the UE bundles and counts ACK/NACK for the PDSCH, performs the channel selection on the ACK/NACK, and sends the ACK/NACK. In other cases, the UE can use the PUCCH format 3 because it can borrow the TPC field of the PDCCH and receive an ARI.

In order to send an ARI, an ARI-dedicated field can be configured in a PDCCH or a TPC field and a DAI field can be borrowed.

Resource and ACK/NACK mapping when a positive Scheduling Request (SR) is present If ACK/NACK transmission and a positive SR are present, the following configuration can be used.

(1) If ACK/NACK is transmitted using the PUCCH format 3, a positive SR, together with the ACK/NACK, is transmitted using the PUCCH format 3.

(2) If ACK/NACK is transmitted using the PUCCH format 1a/1b, a positive SR is transmitted using the PUCCH format 1a/1b through explicitly allocated resources.

If a downlink subframe configured so that an SPS PDSCH is transmitted through the downlink subframe is present within a downlink subframe interval corresponding to an UL CC through which ACK/NACK is transmitted, the following problems may occur. There is a problem in that UE is not aware of whether only the SPS PDSCH has been scheduled or not, whether both a dynamic PDSCH and the SPS PDSCH have been scheduled or not, and whether the dynamic PDSCH has been overridden or not in the downlink subframe configured so that the SPS PDSCH is transmitted through the downlink subframe. There may be problems in that the UE does not receive a PDCCH including the lowest sequence value and the dynamic PDSCH scheduled by the PDCCH is scheduled in the downlink subframe configured so that the SPS PDSCH is transmitted through the downlink subframe.

In order to solve the problems, one ACK/NACK for the SPS PDSCH (the space bundling is performed on the ACK/NACK if a plurality of transmitted codewords is present), and one ACK/NACK for a dynamic PDSCH scheduled by a PDCCH having the lowest sequence value is generated (the space bundling is performed on the ACK/NACK if a plurality of transmitted codewords is present). Next, the ACK/NACKs of the SPS PDSCH or the dynamic PDSCH can be mapped to a location on a signal constellation on which two bits of the PUCCH format 1b are transmitted and then transmitted. Or, the ACK/NACKs of the SPS PDSCH or the dynamic PDSCH can be mapped and transmitted using the channel selection based on the PUCCH format 1b.

Through the methods, the ambiguity of whether ACK/NACK is an ACK/NACK response to an SPS PDSCH or an ACK/NACK response to a dynamic PDSCH can be solved because a PUCCH resource allocated for the ACK/NACK for the SPS PDSCH and a PUCCH resource allocated for the ACK/NACK for the dynamic PDSCH are selectively used. Here, when a positive SR occurs, an operation is performed as in the above-described (2). In this case, an additional method for solving the ambiguity may be necessary because an SR resource is fixed to one. If UE receives only an SPS PDSCH, receives only a dynamic PDSCH scheduled by a PDCCH including the lowest sequence value, or receives an SPS PDSCH and a dynamic PDSCH scheduled by a PDCCH having the lowest sequence value in a downlink subframe corresponding to an uplink subframe in which the UE will send an SR, the following operation can be performed.

A. If the SPS PDSCH is received, the UE generates one ACK/NACK for the SPS PDSCH (performs the space bundling if the number of codewords is plural), B. If the dynamic PDSCH scheduled by the PDCCH including the lowest sequence value is received, the UE generates one ACK/NACK for the dynamic PDSCH (performs the space bundling if the number of codewords is plural), C. The UE maps 1-bit ACK/NACK for the generated SPS PDSCH to a location on an ACK/NACK signal constellation for the codeword 1 (or the codeword 0) of the PUCCH format 1b configured for a positive SR.

D. The UE maps 1-bit ACK/NACK for the generated dynamic PDSCH to a location on an ACK/NACK signal constellation for the codeword 0 (or the codeword 1) of the PUCCH format 1b configured for a positive SR.

Exceptionally, if UE recognizes dynamic PDSCH overriding and receives only a dynamic PDSCH scheduled by a PDCCH including the lowest sequence value, the UE does not bundle the codeword of the dynamic PDSCH, generates individual ACK/NACK (i.e., 1 ACK/NACK for 1 codeword and 2 ACK/NACKs for 2 codewords), and maps the ACK/NACKs to the PUCCH format 1a/1b for a positive SR.

Or, if UE receives only an SPS PDSCH, receives only a dynamic PDSCH scheduled by a PDCCH including the lowest sequence value, or receives both the SPS PDSCH and the dynamic PDSCH in a downlink subframe corresponding to an uplink subframe in which an SR can be transmitted, the UE may not send ACK/NACK for the SPS PDSCH when a positive SR occurs. That is, when a positive SR occurs, the UE uses the PUCCH format 1/1a/1b configured for the positive SR, but sends only ACK/NACK information for the dynamic PDSCH scheduled by the PDCCH including the lowest sequence value. Accordingly, if the UE receives only the SPS PDSCH and the positive SR occurs, the UE sends ACK/NACK information by using the PUCCH format 1 configured for the positive SR without ACK/NACK information about the SPS PDSCH.

Or, if UE receives only an SPS PDSCH, receives only a dynamic PDSCH scheduled by a PDCCH including the lowest sequence value, or receives both the SPS PDSCH and the dynamic PDSCH in a downlink subframe corresponding to an uplink subframe in which an SR can be transmitted, the UE may not send a positive SR when the positive SR occurs. That is, the positive SR is made not occur, or a negative SR may be transmitted although the positive SR occurs.

Or, if UE receives only an SPS PDSCH, receives only a dynamic PDSCH scheduled by a PDCCH including the lowest sequence value, or receives both the SPS PDSCH and the dynamic PDSCH in a downlink subframe corresponding to an uplink subframe in which an SR can be transmitted, a BS may explicitly allocate the two resources of the PUCCH format 1b for a positive SR through RRC in preparation for the occurrence of the positive SR. When the positive SR occurs, the UE sends ACK/NACK according to the channel selection based on the PUCCH format 1b by using the corresponding resources.

Or, if UE receives i) an SPS PDSCH, ii) a dynamic PDSCH scheduled by a PDCCH including the lowest sequence value, or iii) both the SPS PDSCH and the dynamic PDSCH in a downlink subframe corresponding to an uplink subframe in which an SR can be transmitted, 1. A PUCCH resource corresponding to the CCE of the PDCCH for scheduling the dynamic PDSCH 2. A PUCCH resource allocated through RRC for the transmission of ACK/NACK for the SPS PDSCH 3. A PUCCH resource allocated through RRC in order to send the SR One of the three PUCCH resources can be selected and the channel selection for sending ACK/NACK can be used. If the codewords of the dynamic PDSCH are subject to the space bundling although the number of codewords of the dynamic PDSCH is 1 or 2 and one resource corresponding to a PDCCH CCE is used, the following M=3 table is used. If the number of codewords of the dynamic PDSCH is 2 and the codewords are not subject to the space bundling, but individual ACK/NACK is transmitted and two resources corresponding to a PDCCH CCE are utilized, an M=4 table is used. Here, M means the number of downlink subframes corresponding to one uplink subframe.

If M=3, a table can be configured as follows.

TABLE 6

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | No Transmission | |

In the above table, HARQ-ACK(0) is mapped as ACK/NACK for an SPS PDSCH, and HARQ-ACK(1) is mapped as ACK/NACK for a dynamic PDSCH. In HARQ-ACK(2), a positive SR is mapped as ACK and a negative SR is mapped as NACK. $n_{PUCCH,0}^{(1)}$ is a PUCCH resource allocated through RRC for the transmission of ACK/NACK for the SPS PDSCH. $n_{PUCCH,1}^{(1)}$ is a PUCCH resource corresponding to the first CDE of a PDCCH for scheduling the dynamic PDSCH, and $n_{PUCCH,2}^{(1)}$ is a PUCCH resource allocated through RRC in order to send an SR.

Or, HARQ-ACK(0) is mapped as ACK/NACK for a dynamic PDSCH, and HARQ-ACK(1) is mapped as ACK/NACK for an SPS PDSCH. In HARQ-ACK(2), a positive SR is mapped as ACK and a negative SR is mapped as NACK. $n_{PUCCH,0}^{(1)}$ is a PUCCH resource corresponding to the first CDE of a PDCCH for scheduling the dynamic PDSCH, $n_{PUCCH,1}^{(1)}$ is a PUCCH resource allocated through RRC for the transmission of ACK/NACK for the SPS PDSCH, and $n_{PUCCH,2}^{(1)}$ is a PUCCH resource allocated through RRC in order to send an SR.

If M=4, a table can be configured as follows.

TABLE 7

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |

In the above table, HARQ-ACK(0) is mapped as ACK/NACK for an SPS PDSCH, HARQ-ACK(1) is mapped as ACK/NACK for the codeword 0 of a dynamic PDSCH, and HARQ-ACK(2) is mapped as ACK/NACK for the codeword 1 of the dynamic PDSCH. In HARQ-ACK(3), a positive SR is mapped as ACK and a negative SR is mapped as NACK. $n_{PUCCH,0}^{(1)}$ is a PUCCH resource allocated through RRC for the transmission of ACK/NACK for the SPS PDSCH. $n_{PUCCH,1}^{(1)}$ is a PUCCH resource corresponding to the first CDE of a PDCCH for scheduling the dynamic PDSCH, $n_{PUCCH,2}^{(1)}$ is a PUCCH resource corresponding to the second CCE of the PDCCH for scheduling the dynamic PDSCH, and $n_{PUCCH,3}^{(1)}$ is a PUCCH resource allocated through RRC in order to send an SR.

Or, in the above table, HARQ-ACK(0) is mapped as ACK/NACK for the codeword 0 of a dynamic PDSCH, HARQ-ACK(1) is mapped as ACK/NACK for the codeword 1 of the dynamic PDSCH, and HARQ-ACK(2) is mapped as ACK/NACK for an SPS PDSCH. In HARQ-ACK(3), a positive SR is mapped as ACK and a negative SR is mapped as NACK. $n_{PUCCH,0}^{(1)}$ is a PUCCH resource corresponding to the first CDE of a PDCCH for scheduling the dynamic PDSCH, $n_{PUCCH,1}^{(1)}$ is a PUCCH resource corresponding to the second CCE of the PDCCH for scheduling the dynamic PDSCH, $n_{PUCCH,2}^{(1)}$ is a PUCCH resource allocated through RRC for the transmission of ACK/NACK for the SPS PDSCH, and $n_{PUCCH,3}^{(1)}$ is a PUCCH resource allocated through RRC in order to send an SR.

<Resource and ACK/NACK Mapping when a Periodic CSI Report is Present>

If a scheduled PUSCH is not present in a corresponding UL subframe when a subframe in which ACK/NACK for a PDSCH will be transmitted overlaps with the transport cycle of periodic CSI transmitted according to the PUCCH format 2, a PUCCH format and the contents of the PUCCH format can be determined as follows depending on whether the CQI and the ACK/NACK have been configured or not so that they are transmitted at the same time.

1. If the simultaneous transmission of the CQI and the ACK/NACK is not permitted by a higher layer (e.g., 'simultaneousAckNackAndCQI' has been configured to be FALSE), the CSI is discarded and the ACK/NACK can be transmitted using the PUCCH format 1/1a/1b.

2. If the simultaneous transmission of the CQI and the ACK/NACK is permitted by a higher layer (e.g., 'simultaneousAckNackAndCQI' has been configured to be TRUE), since two DM RSs are present in each slot in the case of a normal CP, the first DM RS becomes a basis, and phase modulation can be performed on the second DM RS and a maximum of 2 bits can be transmitted. CSI is transmitted in the data symbol of the PUCCH format 2a/2b, and the ACK/NACK is mapped to the DM RS of the PUCCH format 2a/2b and transmitted.

In the case of an extended CP, information about a DM RS cannot be transmitted because one DM RS is present in each slot. CSI can be transmitted using the PUCCH format 2, and the CSI and the ACK/NACK can be subject to joint coding into a data symbol and then transmitted.

If a downlink subframe configured so that an SPS PDSCH is transmitted is present within a downlink subframe interval corresponding to an UL CC through which ACK/NACK is transmitted through the downlink subframe, a problem may occur when the SPS PDSCH and a dynamic PDSCH scheduled by a PDCCH including the lowest sequence value are transmitted. This is because UE may not receive the PDCCH for scheduling the dynamic PDSCH.

In order to solve this problem, 1. 1 ACK/NACK for the SPS PDSCH can be generated, 1 ACK/NACK for the dynamic PDSCH can be generated, and the two ACK/NACKs can be mapped to a location on the 2-bit signal constellation of the PUCCH format 1b and then transmitted.

Or, 2. ACK/NACK can be transmitted according to the channel selection scheme based on the PUCCH format 1b.

In the aforementioned methods, a PUCCH resource allocated for the ACK/NACK for the SPS PDSCH and a PUCCH resource allocated for the ACK/NACK for the dynamic PDSCH can be selectively used.

If an uplink subframe in which the ACK/NACK will be transmitted using the two methods overlaps with the transport cycle of periodic CSI to be transmitted using the PUCCH format 2, a method of sending the ACK/NACK and the CSI is described below.

First, if 'simultaneousAckNackAndCQI' is configured to be FALSE, only the ACK/NACK has to be transmitted through the PUCCH according to the two methods. In contrast, if 'simultaneousAckNackAndCQI' is configured to be TRUE, ambiguity may occur because the ACK/NACK is transmitted through one resource. In order to solve the ambiguity, the following operation can be performed.

A. If an SPS PDSCH is received, one ACK/NACK for the SPS PDSCH is generated (if the number of codewords is plural, the space bundling is performed), B. If a dynamic PDSCH scheduled by a PDCCH including the lowest sequence value is received, one ACK/NACK for the dynamic PDSCH is generated (if the number of codewords is plural, the space bundling is performed), C. The 1-bit ACK/NACK for the generated SPS PDSCH is mapped to a location on an ACK/NACK signal constellation for a codeword 1 (or a codeword 0).

D. The 1-bit ACK/NACK for the generated dynamic PDSCH is mapped to a location on an ACK/NACK signal constellation for the codeword 0 (or the codeword 1).

E. The 2-bit ACK/NACK generated as in C, and D is mapped to the DM RS of the PUCCH format 2b in the case of a normal CP and is subject to joint coding into CSI in the case of an extended CP and then transmitted using the PUCCH format 2.

Exceptionally, if UE recognizes dynamic PDSCH overriding and receives only a dynamic PDSCH scheduled by a PDCCH including the lowest sequence value, the UE does not bundle the codeword of the dynamic PDSCH, generates individual ACK/NACK (1 ACK/NACK in the case of one codeword and 2 ACK/NACKs in the case of 2 codewords), and sends the generated ACK/NACK by using the PUCCH format 2b in the case of a normal CP and using the PUCCH format 2 in the case of an extended CP.

If the UE receives 1) one or more PDSCHs in an SCC or 2) any one dynamic PDSCH scheduled by a PDCCH having a sequence value other than the lowest sequence value in a PCC in a downlink subframe corresponding to an uplink subframe in which periodic CSI will be transmitted, periodic CSI is dropped and ACK/NACK can be transmitted using the PUCCH format 3. That is, if the ACK/NACK is transmitted using the PUCCH format 3, the periodic CSI is dropped.

A method of multiplexing the periodic CSI and the ACK/NACK can be applied to a TDD channel selection situation in which M is 2 or higher. If UE receives only an SPS PDSCH or only a dynamic PDSCH in a downlink subframe corresponding to an uplink subframe in which the periodic CSI will be transmitted, the UE uses the above-described method. In other cases (i.e., one or more PDSCHs are received in an SCC or a dynamic PDSCH scheduled by a PDCCH not including the lowest sequence value is received in a PCC), the UE sends the ACK/NACK according to the channel selection and drops the periodic CSI.

Figure 18:
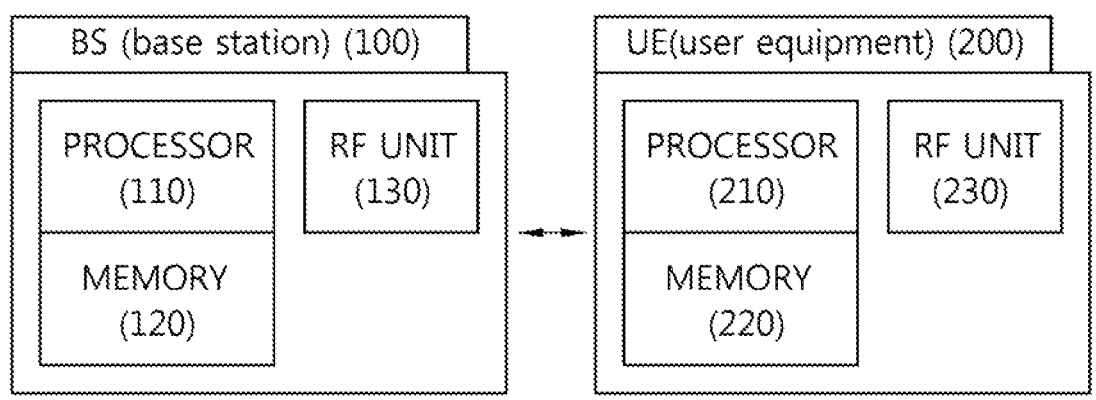
FIG. 18 is a block diagram showing a BS and UE in which the embodiments of the present invention are implemented.

FIG. 18 is a block diagram showing a BS and UE in which the embodiments of the present invention are implemented.

The BS 100 includes a processor 110, memory 120, and a Radio Frequency (RF) unit 130. The processor 110 implements the proposed functions, processes and/or methods. The layers of a radio interface protocol can be implemented by the processor 110. The processor 110 can configure and change a plurality of serving cells for UE through an RRC message. Furthermore, the processor 110 can send a codeword to the UE through a plurality of serving cells or one serving cell and receive ACK/NACK for the codeword. The memory 120 is connected to the processor 110, and the memory 120 stores various pieces of information for driving the processor 110. The RF unit 130 is connected to the processor 110, and the RF unit 130 sends and/or receives radio signals.

The UE 200 includes a processor 210, memory 220, and an RF unit 230. The processor 210 implements the proposed functions, processes and/or methods. The layers of a radio interface protocol can be implemented by the processor 210. The processor 210 receives a plurality of configured serving cells and also receives a codeword through at least one of the plurality of configured serving cells. Furthermore, the processor 210 sends ACK/NACK information indicative of reception acknowledgement for the received codeword. Here, if the UE receives the codeword through only the first serving cell of the plurality of configured serving cells, the UE sends ACK/NACK information according to a first transmission scheme. The first transmission scheme is the same as a scheme for sending ACK/NACK when only one serving cell is configured for the UE. The memory 220 is connected to the processor 210, and the memory 220 stores various pieces of information for driving the processor 210. The RF unit 230 is connected to the processor 210, and the RF unit 230 sends and/or receives radio signals.

The processor 110, 210 may include Application-Specific Integrated Circuits (ASICs), other chipsets, logic circuits and/or data processors. The memory 120, 220 may include Read-Only Memory (ROM), Random Access Memory (RAM), flash memory, memory cards, storage media and/or other storage devices. The RF unit 130, 230 may include a baseband circuit for processing the radio signals. When an embodiment is implemented in software, the above-described scheme may be implemented into a module (process or function) for performing the above functions. The module may be stored in the memory 120, 220 and executed by the processor 110, 210. The memory 120, 220 may be placed inside or outside the processor 110, 210 and may be connected to the processor 110, 210 using a variety of well-known means. In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

The above embodiments include various aspects of examples. Although all possible combinations for representing the various aspects may not be described, those skilled in the art will appreciate that other combinations are possible. Accordingly, the present invention should be construed as including all other replacements, modifications, and changes which fall within the scope of the claims.

The invention claimed is:

1. A method of transmitting acknowledgement/non-acknowledgement (ACK/NACK) by User Equipment (UE) for which a plurality of serving cells has been configured in a wireless communication system operating in Time Division Duplex (TDD), the method comprising:
   configuring a plurality of serving cells;
   receiving a codeword through at least one of the plurality of configured serving cells; and
   transmitting ACK/NACK information indicative of reception acknowledgement for the codeword,
   wherein if the UE receives the codeword through only a first serving cell of the plurality of configured serving cells, the UE transmits the ACK/NACK according to a first transmission scheme, and
   if the UE receives the codeword through the first serving cell and a second serving cell, the UE transmits the ACK/NACK according to a second transmission scheme.

2. The method of claim 1, wherein the first serving cell is a primary cell, and the second serving cell is a secondary cell.

3. The method of claim 1, further comprising:
   receiving a physical downlink control channel (PDCCH) comprising scheduling information about a first codeword through the first serving cell if the UE receives the first codeword through only the first serving cell; and
   transmitting ACK/NACK for the first codeword in a physical uplink control channel (PUCCH) resource mapped to resources occupied by the PDCCH.

4. The method of claim 1, further comprising:
   receiving a physical downlink control channel (PUCCH) comprising scheduling information about the codeword received in the first serving cell through the first serving cell if the UE receives a plurality of codewords through the first serving cell and the second serving cell; and
   transmitting ACK/NACK for the plurality of codewords in a physical uplink control channel (PUCCH) resource mapped to resources occupied by the PDCCH.

5. The method of claim 1, further comprising:
   receiving a PDCCH comprising scheduling information about the codeword, wherein the PDCCH comprises information indicative of a use of the first transmission scheme or the second transmission scheme.

6. An apparatus for transmitting acknowledgement/non-acknowledgement (ACK/NACK) in a wireless communication system operating in Time Division Duplex (TDD), the apparatus comprising:

a radio frequency (RF) unit for transmitting and receiving a radio signal; and
a processor coupled to the RF unit and configured to:
configure a plurality of serving cells,
receive a codeword through at least one of the plurality of configured serving cells and
transmit ACK/NACK information indicative of reception acknowledgement for the codeword,
wherein if the processor receives the codeword through only a first serving cell of the plurality of configured serving cells, the processor transmits the ACK/NACK according to a first transmission scheme, and
if the processor receives the codeword through the first serving cell and a second serving cell, the processor transmits the ACK/NACK according to a second transmission scheme.

7. The apparatus of claim 6, wherein the first serving cell is a primary cell, and the second serving cell is a secondary cell.

8. The apparatus of claim 6, wherein the processor is further configured to
receive a physical downlink control channel (PDCCH) comprising scheduling information about a first codeword through the first serving cell if the processor receives the first codeword through only the first serving cell, and
transmit ACK/NACK for the first codeword in a physical uplink control channel (PUCCH) resource mapped to resources occupied by the PDCCH.

9. The apparatus of claim 6, wherein the processor is further configured to
receive a physical downlink control channel (PDCCH) comprising scheduling information about the codeword received in the first serving cell through the first serving cell if the processor receives a plurality of codewords through the first serving cell and the second serving cell, and
transmit ACK/NACK for the plurality of codewords in a physical uplink control channel (PUCCH) resource mapped to resources occupied by the PDCCH.

10. The apparatus of claim 6,
wherein the processor further configured to receive a physical downlink control channel (PDCCH) comprising scheduling information about the codeword, and
wherein the PDCCH comprises information indicative of a use of the first transmission scheme or the second transmission scheme.

* * * * *